US012670079B2

(12) United States Patent
Yamada

(10) Patent No.: US 12,670,079 B2
(45) Date of Patent: Jun. 30, 2026

(54) GATEWAY DEVICE, ANALYSIS SYSTEM, AND ANALYSIS METHOD

(71) Applicant: HITACHI INDUSTRIAL EQUIPMENT SYSTEMS CO., LTD., Tokyo (JP)

(72) Inventor: Hiroki Yamada, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 44 days.

(21) Appl. No.: 18/729,861

(22) PCT Filed: Dec. 9, 2022

(86) PCT No.: PCT/JP2022/045536
§ 371 (c)(1),
(2) Date: Jul. 17, 2024

(87) PCT Pub. No.: WO2023/139964
PCT Pub. Date: Jul. 27, 2023

(65) Prior Publication Data
US 2025/0147855 A1       May 8, 2025

(30) Foreign Application Priority Data

Jan. 21, 2022    (JP) ................................. 2022-007612

(51) Int. Cl.
*G06F 11/30*          (2006.01)
*H04L 12/66*          (2006.01)
(52) U.S. Cl.
CPC ...... *G06F 11/3006* (2013.01); *G06F 11/3058* (2013.01); *H04L 12/66* (2013.01)
(58) Field of Classification Search
CPC ......................... G06F 11/3006; G06F 11/3058
(Continued)

(56) References Cited

U.S. PATENT DOCUMENTS

2017/0012309 A1 *  1/2017  Venkat ............. H01M 8/04626
2018/0295147 A1   10/2018  Haga et al.
(Continued)

FOREIGN PATENT DOCUMENTS

JP        2006-222649 A     8/2006
JP        2008-204063 A     9/2008
(Continued)

OTHER PUBLICATIONS

International Search Report PCT/JP2022/045536 Feb. 28, 2023.
(Continued)

*Primary Examiner* — Chae M Ko
(74) *Attorney, Agent, or Firm* — MATTINGLY & MALUR, PC

(57)        ABSTRACT

A gateway device collects equipment data and judges whether or not there is any anomaly in the collected equipment data according to a judgement rule(s). An analysis server having an analysis unit transmits and receives information to and from the gateway device and analyzes the received information. An input-output unit executes input and output of the server judgement rule(s), and the gateway device transmits data including a judgement result and the equipment data to the analysis server, wherein the analysis server analyzes the transmission data, and if equipment data indicating an anomaly different from an anomaly defined by the judgement rule(s) exists in the equipment data, the analysis server updates information of the server judgement rule(s) based on input information and transmits the updated information to the gateway device; and the gateway device updates information of the judgement rule(s) based on the server judgement rule information.

12 Claims, 21 Drawing Sheets

(58) Field of Classification Search
USPC ....................................................... 714/37, 26
See application file for complete search history.

(56) References Cited

U.S. PATENT DOCUMENTS

2019/0229976 A1 *   7/2019   Dhesikan ............ H04L 41/0681
2021/0226974 A1      7/2021   Hirano et al.
2022/0108262 A1 *   4/2022   Cella ...................... G05B 17/02

FOREIGN PATENT DOCUMENTS

| JP | 2016-197309 A | 11/2016 | |
|----|---------------|---------|----------------|
| JP | 2021-152977 A | 9/2021 | |
| KR | 102458080 B1 * | 10/2022 | ............... G01H 1/12 |
| TW | 1719438 B | 2/2021 | |
| WO | 2020/110415 A1 | 6/2020 | |

OTHER PUBLICATIONS

Taiwanese Office Action received in corresponding Taiwanese Application No. 111147591 dated Jul. 12, 2023.
Taiwanese Office Action received in corresponding Taiwanese Application No. 111147591 dated Apr. 15, 2024.

* cited by examiner

312

| 312a | 312b | 312c | 312d | 312e | 312f | 312g | 312h | 312i |
|---|---|---|---|---|---|---|---|---|
| Data ID | Connection Destination | Storage Destination | Data Length | Data Type | Communication Method | Cycle | Difference Acquisition | Constant Transmission |
| voltage | 1 | 31001 | 1 | float | Serial | 60 | 1 | 1 |
| ... | ... | ... | ... | ... | ... | ... | ... | ... |

313

| 313a | 313b | 313c | 313d |
|---|---|---|---|
| Monitoring ID | Reference Data ID | Comparison Method | Threshold Value |
| voltageDown | voltage | <= | 5 |
| ... | ... | ... | ... |

314

| Detection ID | Monitoring ID-1 | Monitoring ID-2 | Monitoring ID-3 | Detection Method | Collected Data ID |
|---|---|---|---|---|---|
| 314a | 314b | 314c | 314d | 314e | 314f |
| boot | voltageDown | powerOff | - | AND | {"voltage","uptime",...} |
| ... | ... | ... | ... | | |

701

Transmission Data

```
{
  "Error ID": "Boot",          702
  "Terminal ID": "0001",       703
  "Time Stamp": 20210915153128, 704
  "Data": {                    705
    "voltage": 12.01,
    "uptime": 60,
    "runhour": 30,
    ...}
}
```

FIG. 8

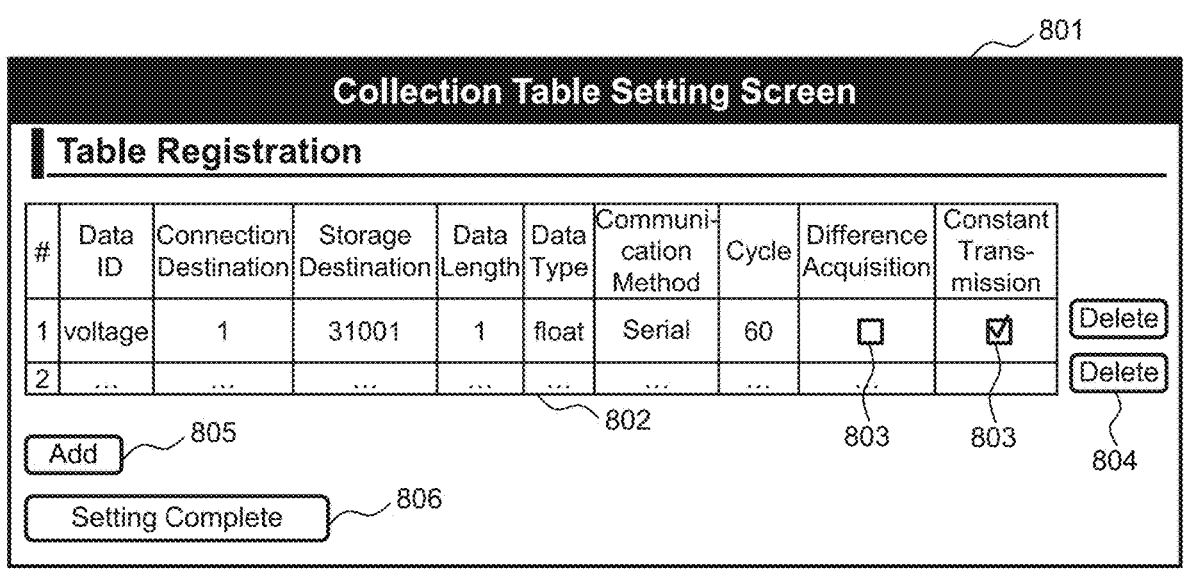

801

Collection Table Setting Screen

Table Registration

| # | Data ID | Connection Destination | Storage Destination | Data Length | Data Type | Communi-cation Method | Cycle | Difference Acquisition | Constant Trans-mission | |
|---|---------|------------------------|---------------------|-------------|-----------|-----------------------|-------|------------------------|------------------------|---|
| 1 | voltage | 1 | 31001 | 1 | float | Serial | 60 | ☐ | ☑ | Delete |
| 2 | ... | ... | ... | ... | ... | ... | ... | | | Delete |

802   803   803   804

Add    805

Setting Complete    806

FIG. 9

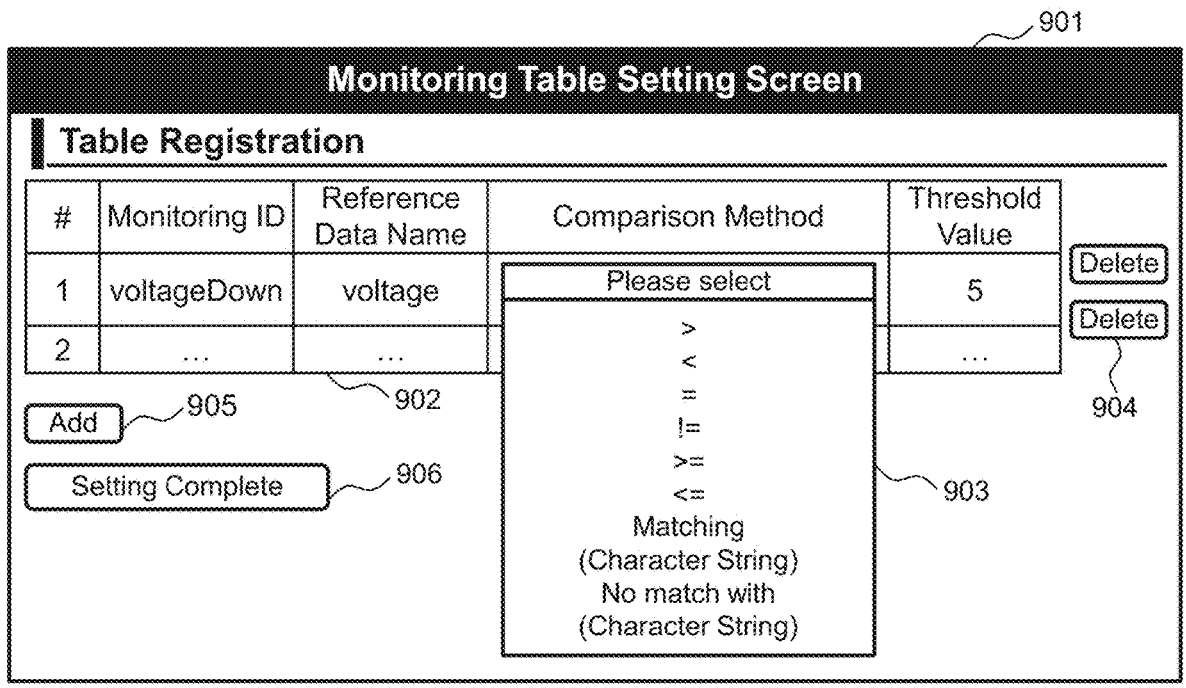

901

Monitoring Table Setting Screen

Table Registration

| # | Monitoring ID | Reference Data Name | Comparison Method | Threshold Value | |
|---|---------------|---------------------|-------------------|-----------------|---|
| 1 | voltageDown | voltage | Please select | 5 | Delete |
| 2 | ... | ... | | ... | Delete |

Please select
>
<
=
!=
>=
<=
Matching
(Character String)
No match with
(Character String)

902   903   904

Add    905

Setting Complete    906

~1801

~1901

GATEWAY DEVICE, ANALYSIS SYSTEM, AND ANALYSIS METHOD

TECHNICAL FIELD

The present invention relates to a gateway device for monitoring the status of a monitored object and to an analysis system and analysis method including the gateway device.

BACKGROUND ART

In recent years, the introduction of industrial IoT (Internet of Things) has been advancing in industrial fields for the purpose of improving utilization rates of equipment and recognizing the status of equipment from remote locations. With the industrial IoT, data acquired from industrial equipment is aggregated to a server via wireless communication and the data is referenced and utilized on the server side to make use of the data to detect predictive signs and monitor the status of equipment.

In general, industrial equipment does not have a communication function, so that a gateway device having the communication function is often connected to the industrial equipment. The gateway device acquires data such as operation information from the industrial equipment, which is data conforming to specified communication standards such as RS232 and RS485, and cyclically transmits the acquired data to a server. The server refers to the acquired data to recognize the operating status of the industrial equipment and detect the occurrence of a failure(s).

However, if the server analyzes all pieces of the acquired data, it will cause heavy load. So, there has been proposed a technique for making the gateway device execute part of the analysis.

For example, there is a technique having a means for causing the gateway device to: detect an anomaly/anomalies by applying judgement rules stored in advance to acquired monitored information; transmit anomaly information related to the relevant anomaly to a monitoring center when detecting the anomaly; and externally update the judgement rules utilized for the anomaly detection (see PTL 1). According to the technique described in PTL 1, the load on the monitoring center (the server) can be reduced.

CITATION LIST

Patent Literature

PTL 1: Japanese Patent Application Laid-Open (Kokai) Publication No. 2016-197309

SUMMARY OF THE INVENTION

Problems to be Solved by the Invention

However, the technique described in PTL 1 detects an anomaly/anomalies by applying the previously stored judgement rules to the acquired monitored information, so that it is not sufficient to detect an anomaly/anomalies of the industrial equipment with high accuracy. Specifically speaking, anomalies that can be incorporated into the judgement rules are known ones, so that it is easy to detect the known anomaly/anomalies; however, practically, unknown anomalies that cannot be incorporated into the judgement rules in advance may occur. Therefore, the technique described in PTL 1 is not sufficient to detect the unknown anomaly/ anomalies that were not incorporated into the judgement rules in advance with respect to the acquired monitored information.

It is an object of the present invention to detect an anomaly/anomalies of a monitored object which were not incorporated into the judgement rules in advance.

Means to Solve the Problems

In order to solve the above-described problem, there is provided according to the present invention an analysis system having one or more gateway devices and an analysis server connected via a communication network, wherein the gateway device includes a data processing unit that collects one or more pieces of equipment data from target equipment to be monitored and executes processing for judging whether or not there is any anomaly of the collected equipment data according to a judgement rule(s); wherein the analysis server includes an analysis unit that transmits and receives information via the gateway device and the communication network and analyzes the received information, and an input-output unit that executes input and output of a server judgement rule(s) corresponding to the judgement rule(s); wherein the data processing unit transmits transmission data including a result of the judgement processing and the equipment data to the analysis server via the communication network; wherein if equipment data indicating an anomaly different from an anomaly defined by the judgement rule(s) exists in the equipment data belonging to the transmission data, the analysis unit transfers analysis result information indicating at least the different anomaly to the input-output unit; wherein the input-output unit outputs the analysis result information indicating the different anomaly transferred from the analysis unit and also updates information of the server judgement rule(s) based on input information; and wherein when the updated server judgement rule information is input, the data processing unit updates information of the judgement rule(s) based on the input server judgement rule information.

Advantageous Effects of the Invention

According to the present invention, it is possible to detect an anomaly/anomalies of the monitored object which were not incorporated into the judgement rules in advance.

BRIEF DESCRIPTION OF DRAWINGS

FIG. 8 is a screen configuration diagram illustrating a collection table setting screen which is output by a GUI generation unit of Embodiment 1 according to this invention;

FIG. 9 is a screen configuration diagram illustrating a monitoring table setting screen which is output by the GUI generation unit of Embodiment 1 according to this invention;

DESCRIPTION OF EMBODIMENTS

Figure 1:
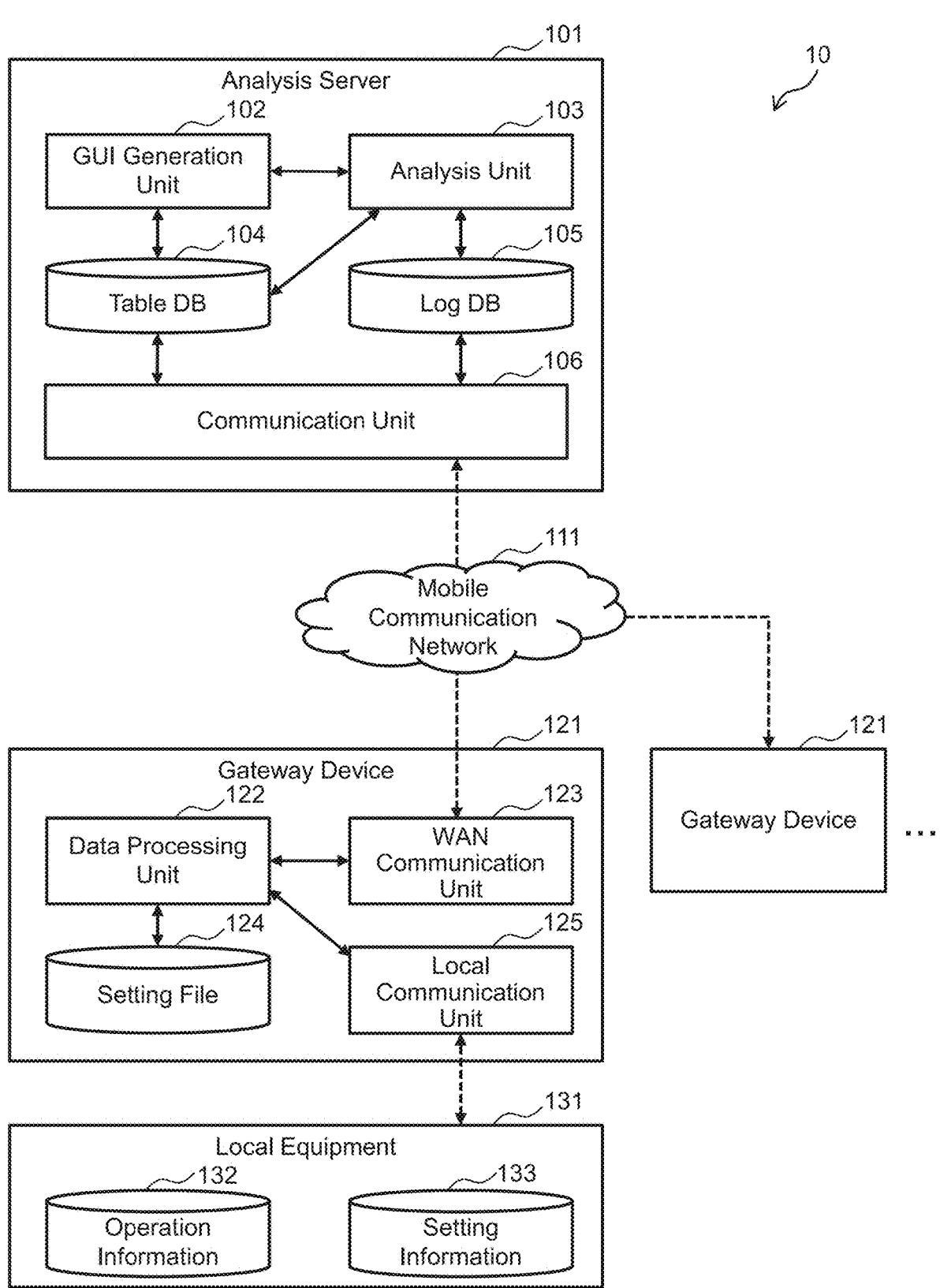
FIG. 1 is a block diagram illustrating an overall configuration of an analysis system of Embodiment 1 according to the present invention.

The present embodiments will be described below with reference to the drawings. However, the present invention should not be construed by being limited to the described content of the following embodiments. It is easily understood by a person skilled in the art that the specific configuration of this invention can be changed within the scope not deviating from the idea or gist of this invention.

In the configurations of the embodiments described below, the same or similar configurations or functions are denoted by the same reference numerals and any duplicate explanations are omitted.

Embodiment 1

FIG. 1 is a block diagram illustrating an overall configuration of an analysis system of Embodiment 1 according to this invention. In FIG. 1, the analysis system 10 includes local equipment 131, a plurality of gateway devices 121, an analysis server 101, and a mobile communication network 111.

The local equipment 131 is industrial equipment such as an air compressor having operation information and setting information. The operation information and the setting information, which are data indicating, for example, the status of the local equipment 131, are transmitted to the gateway devices 121 as information conforming to a communication standard such as a Modbus.

The gateway device 121 is a communication device that detects an anomaly/anomalies of the local equipment 131 by collecting data including the operation information and the setting information from the local equipment 131 and performing a threshold value judgement on the collected data (equipment data). A plurality of gateway devices 121 are connected to one analysis server 101. Each gateway device 121 is configured of a data processing unit 122, a WAN (Wide Area Network) communication unit 123, a local communication unit 125, and a setting file 124.

The local communication unit 125 is configured as a data collection unit for collecting equipment data indicating, for example, the status of the local equipment 131 from the local equipment 131 which is the target to be monitored by the gateway device 121. The data processing unit 122 judges whether or not there is any anomaly in the equipment data collected via the local communication unit 125 according to judgement rules. The WAN communication unit 123 is configured as a gateway communication unit that transmits and receives information to and from the analysis server 101 via the communication network 111. Under this circumstance, the WAN communication unit 123 transmits transmission data including a judgement result of the data processing unit 122 and the equipment data to the analysis server 101 via the communication network 111. The setting file 124 is configured of a table data group including various tables (a collection table, a monitoring table, and a detection table) which define the judgement rules.

The analysis server 101 is a server for analyzing transmission data transmitted from each gateway device 121 and includes a GUI (Graphical User Interface) generation unit 102, an analysis unit 103, a table DB (DataBase) 104, a log DB 105, and a communication unit 106.

The communication unit 106 is configured as a server communication unit for transmitting and receiving information to and from the gateway device 121 via the communication network 111. Under this circumstance, when the communication unit 106 receives an update query for the setting file 124 from the gateway device 121, it refers to data in the table DB 104 and returns the reference result to an update query destination. When the communication unit 106 receives the transmission data transmitted from the gateway device 121, the log DB 105 stores the received transmission data as a log. The table DB 104 are tables corresponding to various tables stored in the setting file 124 of the gateway device 121, and stores information of various server tables (a collection table, a monitoring table, and a detection table) which define the server judgement rules corresponding to the judgement rules.

The analysis unit 103 analyzes the information (transmission data) received by the communication unit 106. Under this circumstance, when the GUI generation unit 102 triggers an analysis execution, the analysis unit 103 acquires data from the table DB 104 and the log DB 105 and executes data analysis. For example, when the transmission data is input from the communication unit 106, the analysis unit 103 analyzes the transmission data; and if the analysis unit 103 acquires the analysis result that equipment data indicating an anomaly different from an anomaly defined by the judgement rules of the gateway device exists in the equipment data belonging to the transmission data, it transfers the analysis result to the GUI generation unit 102. Under this circumstance, the analysis unit 103 can add update prompting information for prompting an update of the server judgement rules to information of the analysis result.

The GUI generation unit 102 generates an analysis results output screen based on the analysis result of the analysis unit 103, outputs a table data setting screen, and causes the content of a change(s) saved on the setting screen to be reflected in the table DB 104. Under this circumstance, the GUI generation unit 102 is configured as an input-output unit that executes input and output of information related to the server judgement rules, displays the update prompting information transferred from the analysis unit 103 on the analysis results output screen, and also updates information of the server judgement rules based on the input information by the operations on the analysis results output screen. The mobile communication network 111 is a communication line conforming to a communication standard such as LTE (Long Term Evolution).

Figure 2:
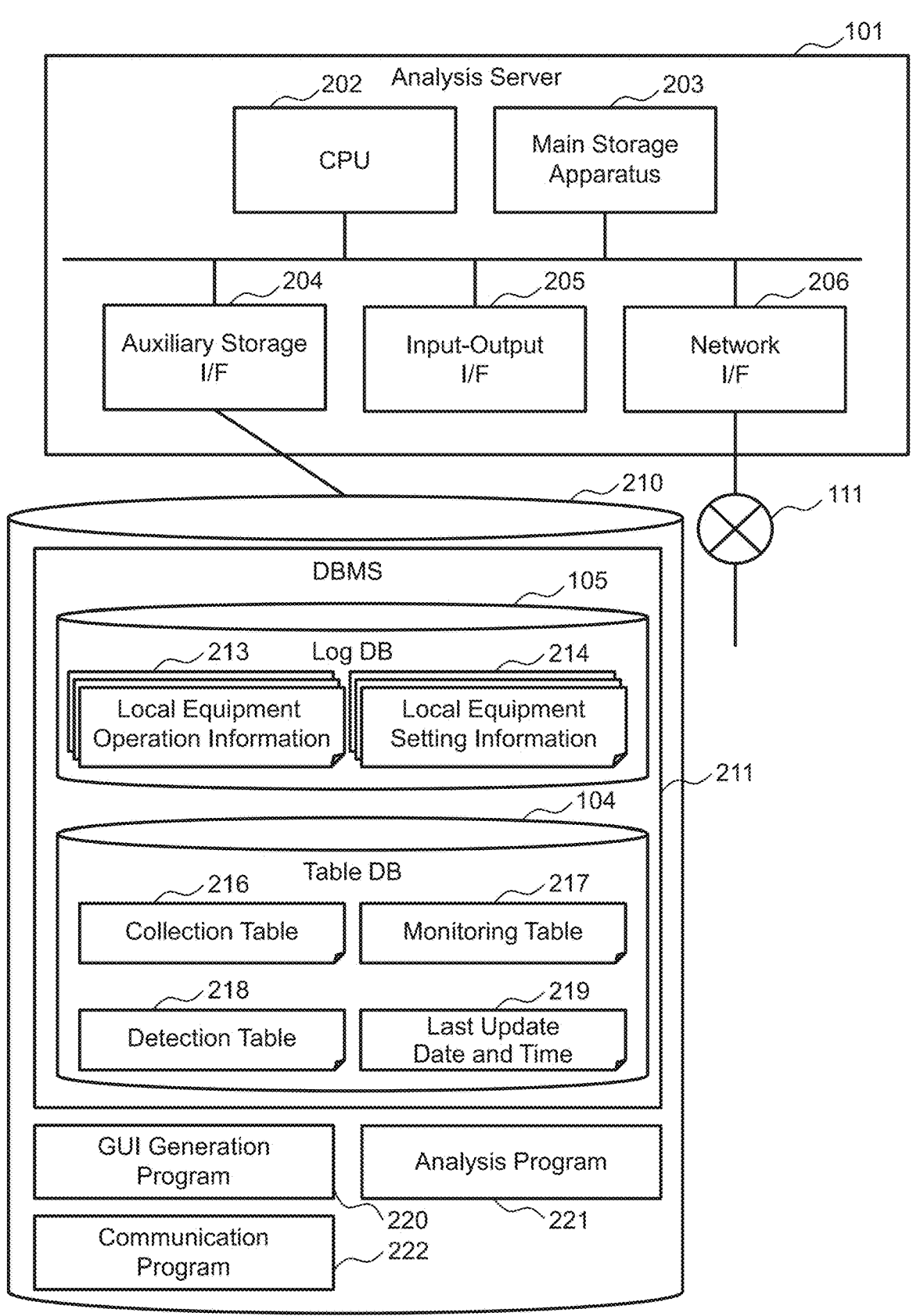
FIG. 2 is a block diagram illustrating a hardware configuration of the analysis server of Embodiment 1 according to this invention.

FIG. 2 is a block diagram illustrating a hardware configuration of the analysis server of Embodiment 1 according to this invention. In FIG. 2, the analysis server 101 includes a CPU (Central Processing Unit) 202, a main storage apparatus 203, an auxiliary storage I/F (InterFace) 204, an input-output I/F 205, and a network I/F 206, where the respective units are connected by a bus.

The CPU 202 controls each unit of the analysis server 101 and loads and executes programs required for the main storage apparatus 203. The main storage apparatus 203 is usually composed of a volatile memory such as a RAM (Random Access Memory) and the main storage apparatus 203 stores the programs to be executed by the CPU 202 and data to be referenced by the CPU 202. The auxiliary storage I/F 204 is an interface for connecting an auxiliary storage apparatus 210 such as an HDD (Hard Disk Drive) and an SSD (Solid State Drive).

The input-output I/F 205 is an interface for connecting input-output devices such as a keyboard and a mouse. The network I/F 206 is an interface for connecting with a mobile communication network 111. The auxiliary storage apparatus 210 has a large storage capacity and stores programs for executing this embodiment. For example, the auxiliary storage apparatus 210 has a DBMS (Data Base Management System) 211, a GUI generation program 220, an analysis program 221, and a communication program 222 which are installed therein.

The DBMS 211, the GUI generation program 220, the analysis program 221, and the communication program 222 are programs for implementing the functions of the log DB 105, the table DB 104, the GUI generation unit 102, the analysis unit 103, and the communication unit 106, respectively.

The log DB 105 stores data including operation information (local equipment operation information) 213 and setting information (local equipment setting information) 214 collected from the local equipment 131 for each log ID. The table DB 104 stores information of a collection table 216, a monitoring table 217, and a detection table 218 as tables for defining the server judgement rules and information about a last update date and time 219.

The collection table 216 is a table for recording setting information related to data collection executed by the gateway device 121. The monitoring table 217 is a table for recording setting information related to a log threshold value judgement executed by the gateway device 121. The detection table 218 is a table for recording setting information related to anomaly detection executed by the gateway device 121. The last update date and time 219 records the dates and times when the above-described table group (the collection table 216, the monitoring table 217, and the detection table 218) was last updated.

Figure 3:
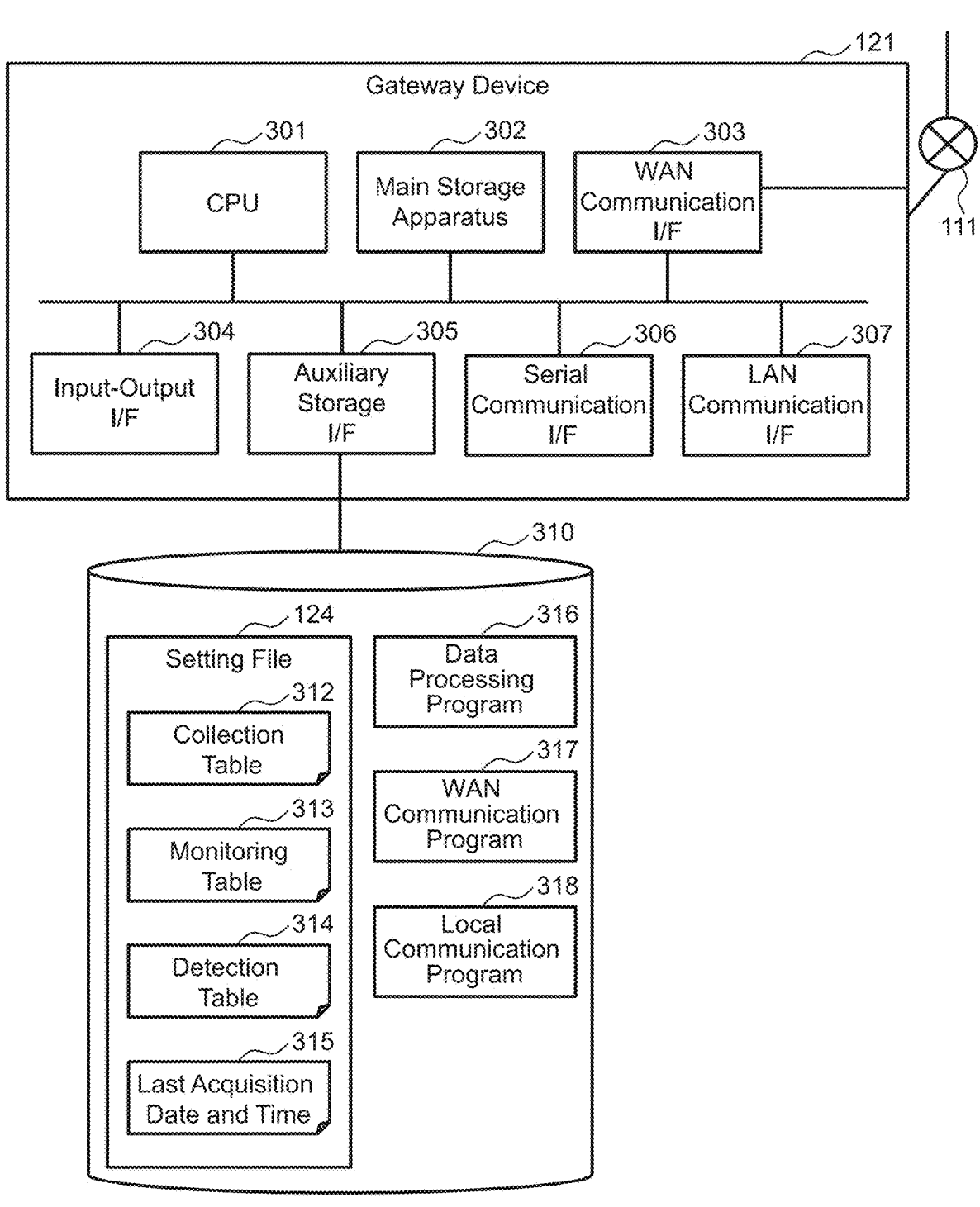
FIG. 3 is a block diagram illustrating a hardware configuration of a gateway device of Embodiment 1 according to this invention.

FIG. 3 is a block diagram illustrating a hardware configuration of the gateway device of Embodiment 1 according to this invention. In FIG. 3, the gateway device 121 includes a CPU 301, a main storage apparatus 302, a WAN communication I/F 303, an input-output I/F 304, an auxiliary storage I/F 305, a serial communication I/F 306, and a LAN (Local Area Network) communication I/F 307, where the respective units are connected by a bus.

The CPU 301 controls each unit of the gateway device 121 and loads and executes programs required for the main storage apparatus 302. The main storage apparatus 302 is usually composed of a volatile memory such as a RAM and stores programs to be executed by the CPU 301 and data to be referenced by the CPU 301.

The WAN communication I/F 303 is an interface for connecting with the mobile communication network 111. The input-output I/F 304 is an interface for connecting input-output devices such as a keyboard and a mouse. The auxiliary storage I/F 305 is an interface for connecting an auxiliary storage apparatus 310 such as an EEPROM (Electrically Erasable Programmable Read Only Memory), an HDD, or an SSD.

The serial communication I/F 306 is an interface for connecting with a serial communication I/F of subordinate equipment when it performs serial communication such as Modbus-RTU (Remote Terminal Unit) with the subordinate equipment such as the local equipment 131. The LAN communication I/F 307 is an interface for connecting with a LAN communication I/F of the subordinate equipment when it performs LAN communication such as Modbus-TCP (Transmission Control Protocol) with the subordinate equipment.

The auxiliary storage apparatus 310 has large storage capacity and stores the setting file 124 and programs for executing this embodiment. The auxiliary storage apparatus 310 have a data processing program 316, a WAN communication program 317, and a local communication program 318 which are installed therein. The data processing program 316, the WAN Communication program 317, and the local communication program 318 are programs for implementing the functions of the data processing unit 122, the WAN communication unit 123, and the local communication unit 125, respectively.

The setting file 124 stores information of a collection table 312, a monitoring table 313, and a detection table 314 as tables for defining the judgement rules and also stores information about a last acquisition date and time 315. The collection table 312, the monitoring table 313, and the detection table 314 are files of the same format as that of the table group (the collection table 216, the monitoring table 217, and the detection table 218) stored in the table DB 104 in FIG. 2. The last acquisition date and time 315 records information of the date and time when the table group information was acquired from the analysis server 101.

Figure 4:
FIG. 4 is a configuration diagram illustrating a collection table of Embodiment 1 according to this invention.

FIG. 4 is a configuration diagram illustrating a collection table of Embodiment 1 according to this invention. In FIG. 4, the collection table 312 is a table defining data collection conditions in the judgement rules and is configured by including a data ID (IDentification) 312a, a connection destination ID 312b, a storage destination (data storage destination) 312d, a data length 312e, a data type 312e, a communication method 312f, a cycle 312g, difference acquisition 312h, and constant transmission 312i regarding each piece of data. Each item will be described below. Incidentally, since the collection table 216 has the same format as that of the collection table 312, an explanation will be provided only about the collection table 312.

The data ID 312a is an identifier for uniquely identifying the relevant data; and the data ID 312a stores information "voltage" when the data type is, for example, "voltage." The connection destination ID 312b is an identifier for uniquely identifying the relevant subordinate equipment. The connection destination ID 312b stores information "1" when the subordinate equipment of the gateway device 121 is first local equipment 131.

The data storage destination 312c is information for identifying the location where the data is stored at the connection destination (subordinate equipment). The data storage destination 312c stores information of a register number in a case of, for example, Modbus-TCP/RTU.

The data length 312d indicates the number of bytes of the data to be acquired. The data type 312e indicates a data type of the data to be acquired. The data type 312e stores information such as Int16B (big-endian 16-bit integer type) or FloatL (little-endian floating decimal type).

The communication method 312f indicates a method by which the gateway device 121 that is a communication device communicates with the subordinate equipment. In the case of Embodiment 1, the communication method 312f stores LAN or serial information.

The cycle 312g indicates a cycle in seconds for the gateway device 121, which is a communication device, to acquire data. When the information "0" is set as the cycle 312g, the data is transmitted when the communication device is started and when a data acquisition value changes.

When the data is numerical value data, the difference acquisition 312h indicates whether or not it acquires a difference from an immediately preceding acquisition value. The difference acquisition 312h stores information "1" or "0" depending on the content of a log to be acquired. For example, since an amount of communication data is usually managed as a total amount of communication, when the gateway device 121 acquires data, it acquires an increase amount by cyclically taking a difference from the previous acquisition value. Therefore, in a case of a log whose difference from the previous acquisition value is meaningful, the difference acquisition 312h stores the information "1." When the difference acquisition 312h is "1," the gateway device 121 transmits the data indicating the difference from the previous acquisition value to the analysis server 101. When the difference acquisition 312h is "0," the gateway device 121 transmits the data indicating the acquisition value to the analysis server 101 directly without processing the acquisition value.

The constant transmission 312i is the item indicating whether or not data is to be transmitted including during normal times. For example, the constant transmission 312i is the item that determines whether log transmission in normal times should be performed or the log transmission in normal times should be stopped. The constant transmission 312i stores the information "0" or "1." When the constant transmission 312i is "0," the gateway device 121 transmits the data to the analysis server 101 only when the data matches conditions of the detection table 314; and the gateway device 121 stops transmitting the data to the analysis server 101 when the data does not match the conditions of the detection table 314. When the constant transmission 312i is "1," the gateway device 121 transmits the data to the analysis server 101 cyclically. Under this circumstance, for example, if the data volume for the relevant month has a surplus, it is possible to perform the operation so that the data in normal times is acquired by way of sampling. Contrarily, if the data volume is severely limited for the relevant month due to, for example, a firmware update of the local equipment 131, it is also possible to perform the operation so that that the data collection is stopped in normal times. Therefore, depending on which of these operations is adopted, either the information "0" or "1" can be set to the constant transmission 312i. Moreover, if there is enough collected data in normal times, it is also possible to perform the operation so that the information of the constant transmission 312i is set to "0."

Figure 5:
FIG. 5 is a configuration diagram illustrating a monitoring table of Embodiment 1 according to this invention.

FIG. 5 is a configuration diagram illustrating the monitoring table of Embodiment 1 according to this invention. In FIG. 5, the monitoring table 313 is a table defining data monitoring conditions in the judgement rules and is configured by including a monitoring ID 313a, a reference data ID 313b, a comparison method 313c, and a threshold value 313d regarding each monitoring condition. Each item will be described below. Incidentally, since the monitoring table 217 has the same format as that of the monitoring table 313, an explanation will be provided only about the monitoring table 313.

The monitoring ID 313a is an identifier for uniquely identifying the relevant monitoring condition. When the monitoring condition is a voltage drop, for example, the monitoring ID 313a stores information "voltage Down."

The reference data ID 313b indicates an ID for the relevant data collected and monitored by the gateway device 121. When the type of data collected by the gateway device 121 is a voltage in the same way as the information recorded in the data ID 312a of the collection table 312, the reference data ID 313b stores the information "voltage."

The comparison method 313c indicates a method for comparison with the threshold value 313d when monitoring the target data to be monitored. For example, when the data is a numeric value, the comparison method 313c stores information such as "equal to or more than," "equal to or less than," "more than," "less than," "matching," or "no match with" as the method for comparing the target data to be monitored with the threshold value 313d. Moreover, when the data is a character string, for example, the comparison method 313c stores information such as "matching" or "no match with" as the method for comparing the target data to be monitored with the threshold value 313d.

The threshold value 313d indicates a comparison target for the target data to be monitored. The threshold value 313d stores, for example, information "5" as the comparison target for the target data to be monitored. Under this circumstance, if the conditions are satisfied as a result of comparing the target data to be monitored with the information recorded in the threshold value 313d, the gateway device 121 judges that the monitoring condition recorded in the monitoring ID 313a is satisfied.

Figures 6, 7:
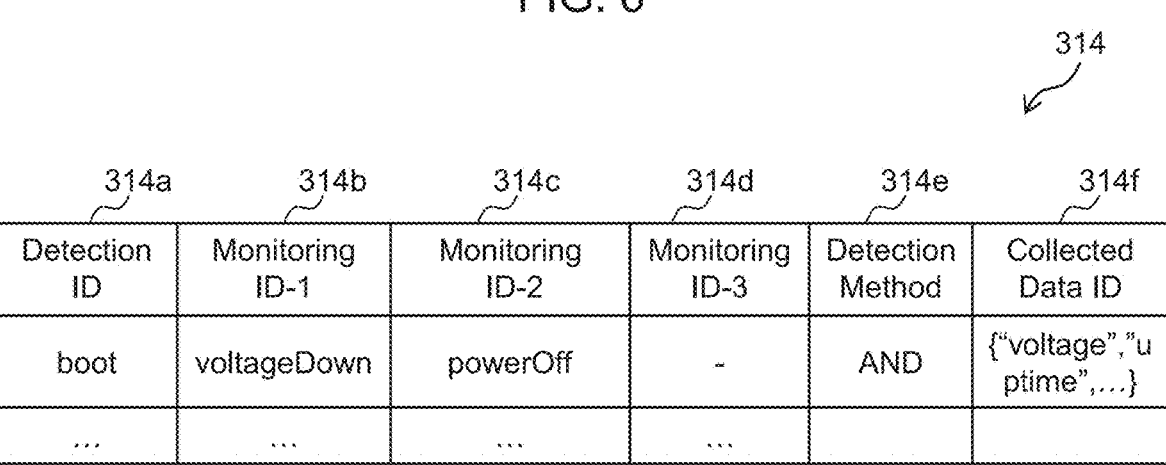
FIG. 6 is a configuration diagram illustrating a detection table of Embodiment 1 according to this invention.
FIG. 7 is a configuration diagram illustrating transmission data transmitted to the analysis server by the gateway device of Embodiment 1 according to this invention.

FIG. 6 is a configuration diagram illustrating the detection table of Embodiment 1 according to this invention. In FIG. 6, the detection table 314 is a table for defining anomaly detection conditions in the judgement rules and is configured by including a detection ID 314a, a monitoring ID (ID-1) 314b, a monitoring ID (ID-2) 314c, a monitoring ID (ID-3) 314d, a detection method 314e, and a collected data ID 314f regarding each detection condition. Each item will be described below. Incidentally, since the detection table 218 has the same format as the detection table 314, an explanation will be provided only about the detection table 314.

The detection ID 314a is an identifier for uniquely identifying the relevant anomaly detection condition. When the anomaly detection condition is, for example, reboot, the detection ID 314a stores information "boot."

The monitoring IDs 314b to 314d are identifiers for uniquely identifying the relevant monitored objects in order to detect any anomaly. The monitoring IDs 314b to 314d store information recorded in the monitoring ID 313a of the monitoring table 313. For example, the monitoring ID 314b stores the information "voltage Down." In this embodiment, a maximum of three conditions can be designated as the monitoring IDs, but the number of conditions is variable. Moreover, if one or more IDs are stored in the item(s) of the monitoring ID(s), the detection according to the anomaly detection condition(s) is performed.

The detection method 314e indicates a detection method for performing anomaly detection. The detection method 314e stores "AND" or "OR" as information used for processing when there are multiple conditions registered in the monitoring IDs 314b to 314d. If the information "AND" is stored in the detection method 314e, it is considered that the anomaly recorded in the detection ID 314a has occurred because all conditions are satisfied. On the other hand, if the information "OR" is stored in the detection method 314e, it is considered that the anomaly recorded in the detection ID 314a has occurred because any one of the conditions is satisfied.

The collected data ID 314f indicates a data ID of the relevant data transmitted to the analysis server 101 when the anomaly recorded in the detection ID 314a is detected. Incidentally, the collected data ID314f can designate a plurality of IDs. For example, when data about the voltage and operation time are transmitted to the analysis server 101, the collected data ID 314f stores information "voltage" and "uptime."

FIG. 7 is a configuration diagram indicating transmission data to be transmitted to the analysis server by the gateway device of Embodiment 1 according to this invention. In FIG. 7, the transmission data 701 is in the JSON (Java Script Object Notation) format and is configured by including an error ID 702, a terminal ID 703, a time stamp 704, and data 705 as elements.

The error ID 702 stores, for example, "Boot" when anomalous data is transmitted, as information recorded in the detection ID 314a of the detection table 314. Incidentally, regarding the item for which the constant transmission 312i of the collection table 312 is set to "1," the error ID 702 stores an empty character string when normal data is transmitted. Under this circumstance, when the information recorded in the error ID 702 is an empty character string, the analysis server 101 recognizes the received transmission data 701 as data transmitted at normal time (normal time data). On the other hand, when the information recorded in the error ID 702 is, for example, "Boot," the analysis server 101 recognizes the received transmission data 701 as the data transmitted upon detecting an anomaly (anomalous time data).

The terminal ID 703 is an ID for uniquely identifying the relevant gateway device 121. The terminal ID 703 stores a preset value when the gateway device 121 is shipped. The time stamp 704 indicates a time of day when the information recorded in the detection ID 314a of the detection table 314 ("boot") was detected.

The data 705 indicates data recorded in the collected data ID 314f of the detection table 314 and information related to that data. When the data 705 stores data recorded in the collected data ID 314f of the detection table 314, it stores the data ("voltage," "uptime," etc.) recorded in the collected data ID 314f as a key(s) and the collected value of each piece of data as a value.

FIG. 8 is a screen configuration diagram illustrating a collection table setting screen which is output by the GUI generation unit of Embodiment 1 according to this invention. In FIG. 8, a collection table setting screen 801 of the analysis server 101 displays a setting table 802, check boxes 803, delete buttons 804, an add button 805, and a setting complete button 806.

The setting table 802 is a table that displays the current status of the collection table 216 (the status in the same format as that of the collection table 312) and allows the user to edit and change the settings.

The check box 803 is an element belonging to the setting table 802. The check box 803 stores, as a set value: "1" when the box is checked; and "0" when the box is unchecked.

The delete button 804 is a button for deleting information of one row from the setting table 802 displayed on the left side of the delete button 804. The add button 805 is a button for adding information of one row to the setting table 802.

The setting complete button 806 is a button for closing the collection table setting screen 801 after the setting operation is completed. When the setting complete button 806 is selected, the GUI generation unit 102 executes table update processing targeted on the collection table 216.

FIG. 9 is a screen configuration diagram illustrating a monitoring table setting screen which is output by the GUI generation unit of Embodiment 1 according to this invention. In FIG. 9, a monitoring table setting screen 901 of the analysis server 101 displays a setting table 902, a pull-down box 903, delete buttons 904, an add button 905, and a setting complete button 906.

The setting table 902 is a table that displays the current status of the monitoring table 217 (the status in the same format as that of the monitoring table 313) and allows the user to edit and change the settings.

The pull-down box 903 is an element belonging to the setting table 902; and when it is selected, the pull-down box 903 displays settable values (">," "<," "=," etc.). When any one of the displayed values is selected, the selected value is stored as a set value.

The delete buttons 904, the add button 905, and the setting complete button 906 present the same behaviors those of as the delete buttons 804, the add button 805, and the setting complete button 806 on the collection table setting screen 801, respectively; however, they are targeted on the monitoring table 217.

Figure 10:
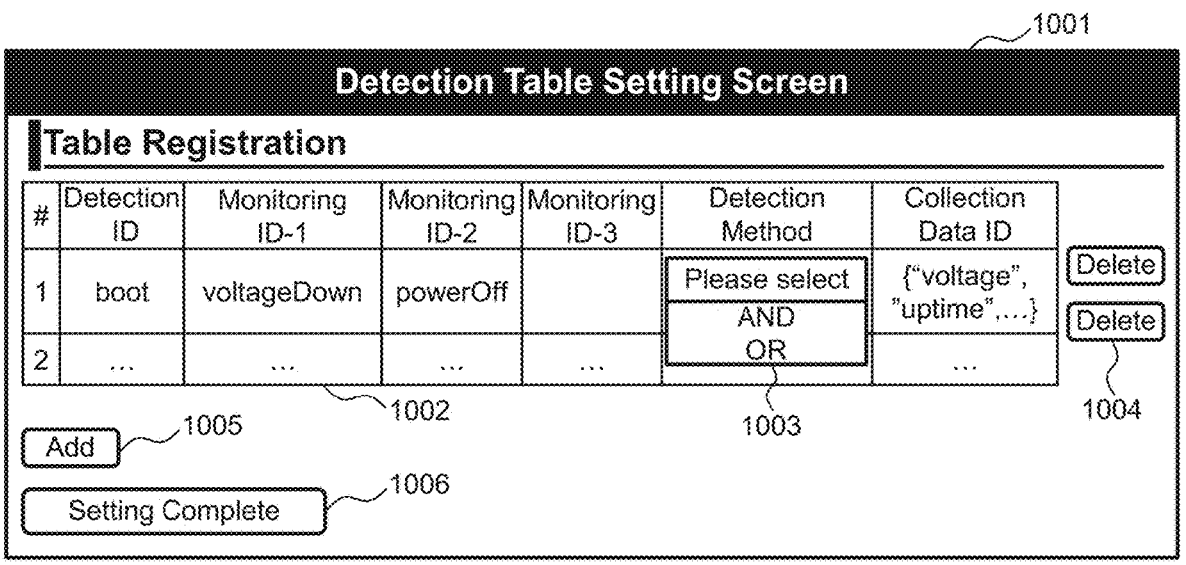
FIG. 10 is a screen configuration diagram illustrating a detection table setting screen which is output by the GUI generation unit of Embodiment 1 according to this invention.

FIG. 10 is a screen configuration diagram illustrating a detection table setting screen which is output by the GUI generation unit of Embodiment 1 according to this invention. In FIG. 10, a detection table setting screen 1001 of the analysis server 101 displays a setting table 1002, a pull-down box 1003, delete buttons 1004, an add button 1005, and a setting complete button 1006.

The setting table 1002 is a table that displays the current status of the detection table 218 (the status in the same format as that of the detection table 314) and allows the user to edit and change the settings.

The pull-down box 1003 presents behaviors similar to those of the pull-down box 903 on the monitoring table setting screen 901. The delete buttons 1004, the add button 1005, and the setting complete button 1006 present the same behaviors as those of the delete buttons 804, the add button 805, and the setting complete button 806 on the collection table setting screen 801, respectively; however, they are targeted on the detection table 218.

Figure 11:
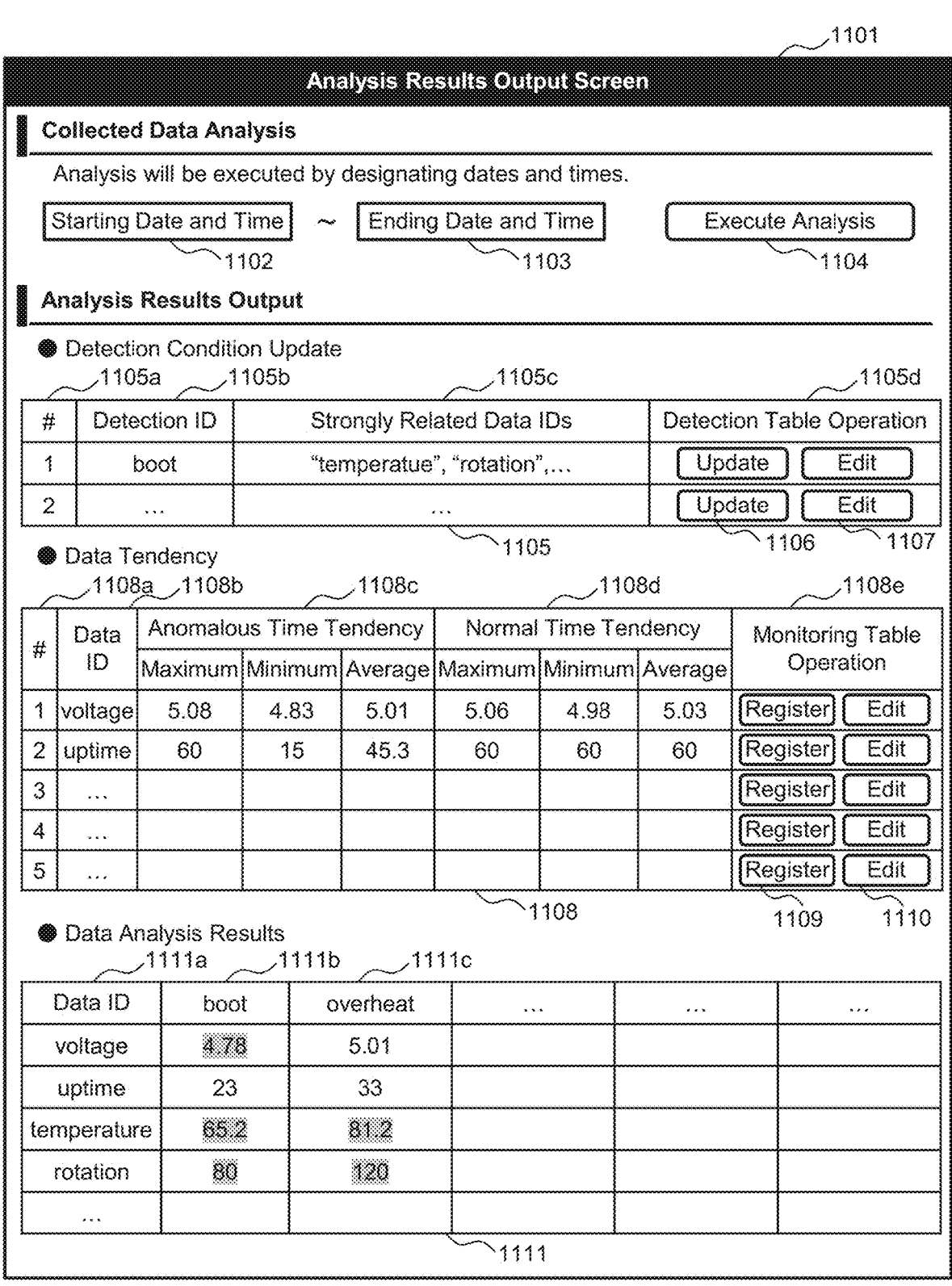
FIG. 11 is a screen configuration diagram illustrating an analysis results output screen which is output by the GUI generation unit of Embodiment 1 according to this invention.

FIG. 11 is a screen configuration diagram illustrating an analysis results output screen which is output by the GUI generation unit of Embodiment 1 according to this invention. In FIG. 11, an analysis results output screen 1101 of the analysis server 101 displays a starting-date-and-time input box 1102, an ending-date-and-time input box 1103, an execute analysis button 1104, a detection condition update table 1105, a data tendency table 1108, and a data analysis results table 1111.

Information of the relevant date and time for identifying a target analysis period is entered in the starting-date-and-time input box 1102 and the ending-date-and-time input box 1103. Under this circumstance, when executing the analysis, the analysis unit 103 refers to the time stamp of the log and narrows down target logs to be analyzed to a log within the time period entered in the starting-date-and-time input box 1102 and the ending-date-and-time input box 1103.

The execute analysis button 1104 is a button for starting the analysis using the log of the designated date and time. When the analysis by the analysis unit 103 is completed, the displays of the detection condition update table 1105, the data tendency table 1108, and the data analysis results table 1111 are updated.

The detection condition update table 1105 is a table for: enumerating data regarding which a change(s) was large as compared to the normal time data (anomalous time data indicating an unexpected anomaly) among the data which satisfied the detection conditions and were collected; and prompting an update of the detection conditions. The detection condition update table 1105 includes # (number) 1105a, a detection ID 1105b, strongly related data IDs 1105c, a detection table operation 1105d, detection table update buttons 1106, and detection table edit buttons 1107.

The detection ID 1105b is a detection ID ("boot") defined in the detection table 218. The strongly related data IDs 1105c display, regarding each detection ID, the data IDs when detecting data with large changes as compared to the normal time data. For example, if the data received from the gateway device 121 includes data such as "voltage," "uptime," "temperature," and "rotation" and the data having large changes as compared to the normal time data are the "temperature" and the "number of rotations," the strongly related data IDs 1105c display the information "temperature" and "rotation." The analysis results output screen 1101 displays these pieces of information as update prompting information for prompting an update of the detection table 218. In Embodiment 1, any large change(s) indicates that an average value has changed by 10% or more as compared to the relevant value at normal time.

The detection table update button 1106 of the detection table operation 1105d is a button for updating the data ID collected in the detection table 218. The intention of the operation by the detection table update button 1106 is to collect only the data IDs related to anomalies so as not to reduce the information collection efficiency at the time of detecting anomalies while reducing the amount of data communication. Therefore, when the detection table update button 1106 is pressed, for example, even if the data IDs of four items have been collected by the detection ID, the detection table 218 can be updated to collect only the data of the two items enumerated in the strongly related data IDs.

The detection table edit button 1107 is a button for, when selected, outputting the detection table setting screen 1001 as a separate screen. By selecting the detection table edit button 1107, the user can edit the detection table 218 while referring to the detection condition update table 1105.

The data tendency table 1108 is a table for outputting a maximum value, a minimum value, and an average value of data for each data ID. The data tendency table 1108 includes # (number) 1108a, a data ID 1108b, an anomalous time tendency 1108c, a normal time tendency 1108d, a monitoring table operation 1108e, a monitoring table register button 1109, and a monitoring table edit button 1110.

The data ID 1108b is the same item as the data ID 312a of the collection table 312. The anomalous time tendency 1108c outputs a maximum value, a minimum value, and an average value of the data (anomalous time data), whose error ID stores the anomalous time information (for example, "boot"), among the target data to be analyzed.

The normal time tendency 1108d outputs a maximum value, a minimum value, and an average value of the data (normal time data), whose error ID is empty, among the target data to be analyzed.

The monitoring table register button 1109 is a button for newly registering the monitoring conditions of the data ID in the same row as the row to which the monitoring table register button 1109 belongs. When the monitoring table register button 1109 is selected, a screen for adding the monitoring conditions (a monitoring condition add screen 1203 in FIG. 12) is displayed as a separate screen.

The monitoring table edit button 1110 is a button for, when selected, outputting the monitoring table setting screen 901 as a separate screen. By selecting the monitoring table edit button 1110, the user can edit the monitoring table 217 while referring to the data tendency table 1108.

The data analysis results table 1111 is a table for outputting the average value of data collected when an anomaly is detected for each detection ID. The data analysis results table 1111 includes a data ID 1111a and detection IDs 1111b, 1111c, and so on. Information of the data ID 111a is stored at the beginning of each row of the data analysis results table 1111. "Boot" and "overheat" are recorded as the detection IDs in the detection IDs 1111b and 1111c, and the average value for each piece of data collected when the conditions of the detection IDs were satisfied is displayed. When the displayed average value has changed by 10% or more as compared to the average value at normal time, that numerical value is displayed in a marked state.

By referring to the data analysis results table 1111, the data IDs that need to be collected for each detection ID are clarified and the detection IDs whose data have changed largely can also be clarified among the data having the same data ID. There is a possibility that the detection IDs with the same tendency in the same data might have captured the same phenomenon. Therefore, by integrating the conditions, it becomes possible to update the conditions that will not reduce the information collection efficiency when detecting any anomaly, while reducing data transmission opportunities and reducing the data traffic.

For example, in a case of an unintended reboot and thermal runaway, it is suspected that the reboot might have occurred as a result of the thermal runaway. Moreover, if it is suspected that the reboot might have occurred due to a voltage drop, the unintended reboot will lead to detailed anomaly detection and a reduction in the data volume by dividing them and integrating them into the detection IDs of thermal runaway and voltage drop.

Figure 12:
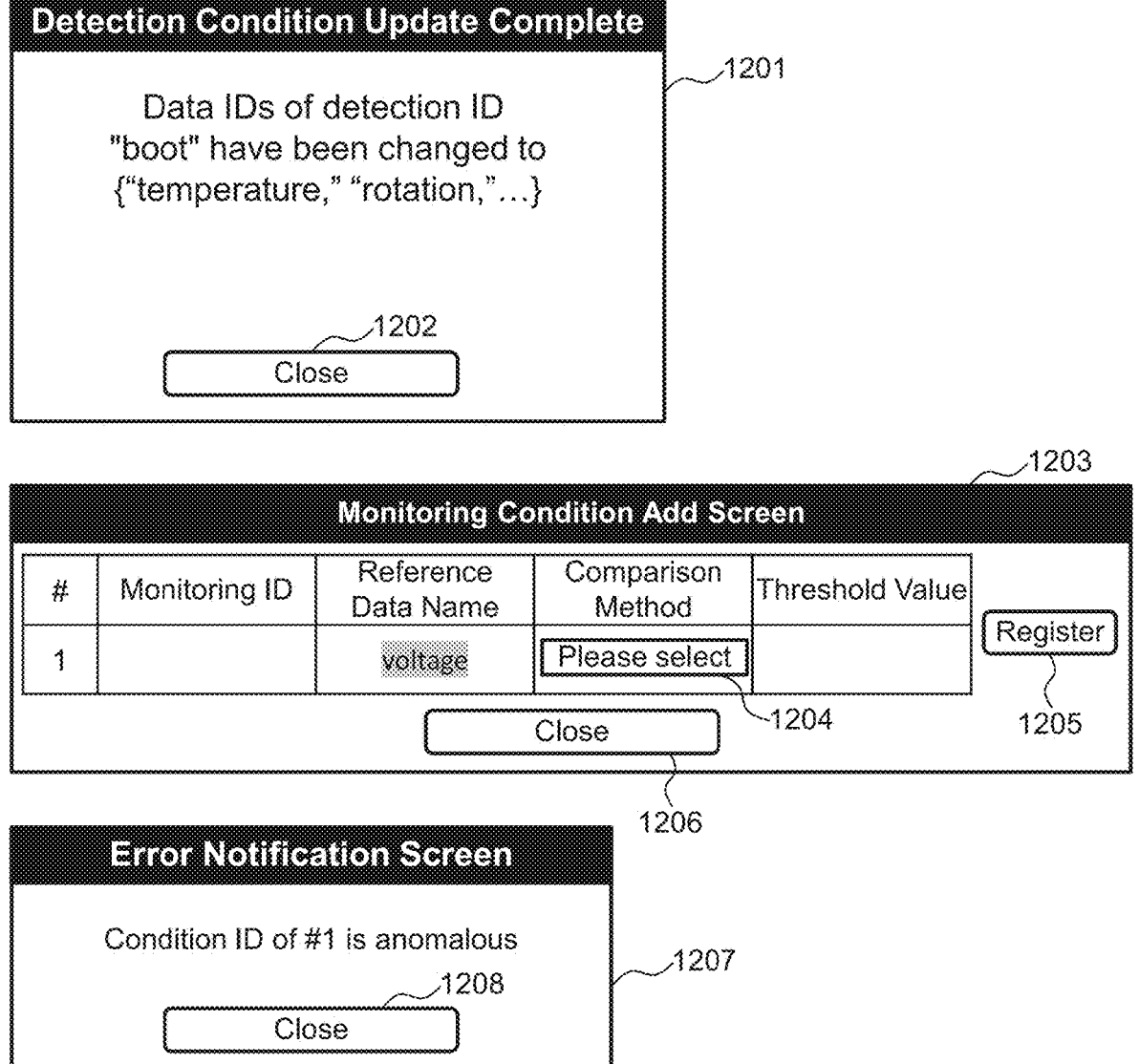
FIG. 12 is a screen configuration diagram illustrating popup screens which are output by the GUI generation unit of Embodiment 1 according to this invention.

FIG. 12 is a screen configuration diagram illustrating pop-up screens which are output by the GUI generation unit of Embodiment 1 according to this invention. In FIG. 12, a detection condition update complete screen 1201 of the analysis server 101 is output when the detection table update button 1106 in the detection condition update table 1105 of the analysis results output screen 1101 is selected. The detection condition update complete screen 1201 displays the updated detection ID information ("boot") and the updated collected data ID information ("temperature" and "rotation"). When a close button 1202 is selected, the detection condition update complete screen 1201 closes.

The monitoring condition add screen 1203 is output when the monitoring table register button 1109 in the data tendency table 1108 of the analysis results output screen 1101 is selected. The monitoring condition add screen 1203 includes a setting table 1204 that is the same as the setting table 902 of the monitoring table setting screen 901, a register button 1205, and a close button 1206. The monitoring condition add screen 1203 displays the setting table 1204 similar to that of the monitoring table setting screen 901, but the information ("voltage") recorded in the data ID of the same row as that of the monitoring table register button 1109 of the analysis results output screen 1101 is entered in a reference data name column in advance.

The register button 1205 is a button for, when selected, adding the information of the setting table 1204 entered in the monitoring conditions add screen 1203 to the existing monitoring table 217. When the close button 1206 is selected, the monitoring condition add screen 1203 closes.

An error notification screen 1207 is a screen for notifying an error when a set value is in a format that cannot be entered in the collection table setting screen 801, the monitoring table setting screen 901, the detection table setting screen 1001, and the monitoring condition add screen 1203. The error notification screen 1207 displays, for example, information stating "Condition ID of #1 is anomalous" when the condition ID of #1 cannot be entered. Under this circumstance, when the set value cannot be entered, it means, for example, the case where a character string is entered in an item for which numerical data is expected. Since each setting table has row numbers, the user can be notified of an input error by displaying the row number and the relevant column name. If there are a plurality of errors, only the first error detected is displayed. When the close button 1208 is selected, the error notification screen 1207 closes.

Figure 13:
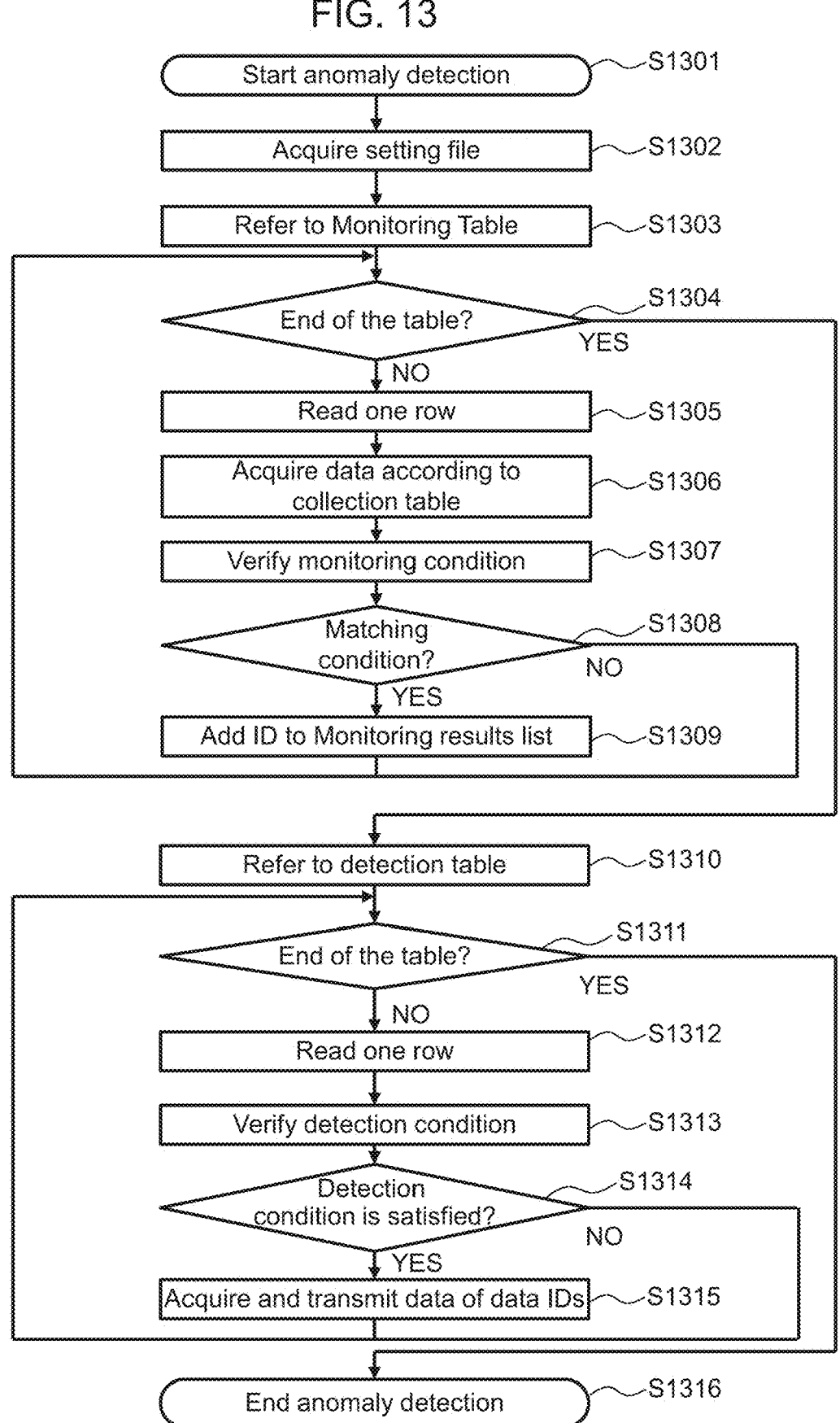
FIG. 13 is a flowchart illustrating anomaly detection processing of a data processing unit of Embodiment 1 according to this invention.

FIG. 13 is a flowchart illustrating anomaly detection processing of the data processing unit of Embodiment 1 according to this invention. This processing is started when the CPU 301 of the gateway device 121 starts the data processing unit 122.

The data processing unit 122 executes the following processing in every anomaly detection cycle which is set in advance at the time of shipping the gateway device 121 (S1301). Firstly, the data processing unit 122 acquires the information of the collection table 312, the monitoring table 313, and the detection table 314 from the setting file 124 (S1302), refers to the information of the monitoring table 313 among the acquired information (S1303), and then executes the processing of step S1304 to step S1309 by referring to the information of the monitoring table 313 row by row.

The data processing unit 122 checks the referenced part of the monitoring table 313 and judges whether or not the referenced part is at the end of the table (S1304); and if it is judged in step S1304 that the referenced part is at the end of the table (YES), the data processing unit 122 proceeds to step S1310; and if it is judged in step S1304 that the referenced part is not at the end of the table (NO), the data processing unit 122 reads information of one row from the monitoring table 313 (S1305).

Next, the data processing unit 122 acquires the information of the collection table 312 based on the information of the reference data ID 313*b* ("voltage") described in the row read in step S1305, refers to the row of the data ID 312*a* ("voltage") recorded in the collection table 312, and collects the data recorded in the data ID 312*a* ("voltage") from the local equipment 131 via the local communication unit 125 (S1306). Subsequently, the data processing unit 122 verifies the monitoring condition ("voltage Down") against the collected data as threshold verification based on the information recorded in the comparison method 313*c* and the threshold value 313*d* of the row read from the monitoring table 313 (S1307) and judges whether or not the collected data matches the condition in comparison with the threshold value (S1308).

If it is judged in step S1308 that the collected data does not match the condition in comparison with the threshold value (NO), the data processing unit 122 returns to the processing of step S1304 and repeats the processing of steps S1304 to S1308; and if it is judged in step S1308 that the collected data matches the condition in comparison with the threshold value (YES), the data processing unit 122 adds the information of the monitoring ID 313*a* with the matching condition ("voltage Down") to a monitoring result list as a monitoring condition. Under this circumstance, the monitoring result list is temporary data managed in a RAM of the gateway device 121 and its content is a list of information recorded in the monitoring ID 313*a* with the matching condition. The monitoring result list is deleted when the anomaly detection processing is completed.

On the other hand, if it is judged in step S1304 that the referenced part is at the end of the monitoring table 313, the data processing unit 122 refers to the information of the detection table 314 among the tables acquired in step S1302 (S1310), and then executes the processing of step S1311 to step S1315 by referring to the information of the detection table 314 row by row.

The data processing unit 122 checks the referenced part of the detection table 314 and judges whether or not the referenced part is at the end of the table (S1311); and if it is judged in step S1311 that the referenced part is at the end of the detection table 314 (YES), the data processing unit 122 proceeds to step S1316; and if it is judged in step S1311 that the referenced part is not at the end of the detection table (NO), the data processing unit 122 reads information of one row from the detection table 314 (S1312).

Next, the data processing unit 122 compares the monitoring IDs (monitoring IDs 314*a* to 314*d*) with the monitoring IDs added to the monitoring result list (the monitoring result list in step S1309) among the information read from the detection table 314, and verifies whether or not both of them are the information recorded in the detection method 314*e* of the detection table 314 ("AND" or "OR") and match the detection condition, for example, the anomaly detection condition ("boot") (S1313). If "AND" is recorded in the detection method 314*e* of the detection table 314, the data processing unit 122 verifies whether or not all of the monitoring IDs 314*a* to 314*d* of the detection table 314 exist in the monitoring result list. If "OR" is recorded in the detection method 314*e* of the detection table 314, the data processing unit 122 verifies whether or not one or more of the monitoring IDs 314*a* to 314*d* of the detection table 314 exist in the monitoring result list.

Next, the data processing unit 122 judges whether or not the verification result in step S1313 satisfies the detection condition (S1314); and if it is judged in step S1314 that the verification result in step S1313 satisfies the detection condition (YES), the data processing unit 122 collects the data IDs of the data recorded in the collected data ID314*f* of the detection table 314 ("voltage," "uptime," etc.), transmits the collected data IDs (data) in the format of transmission data to the analysis server 101 via the WAN communication unit 123 (S1315), and then returns to step S1311 and repeats the processing of steps S1311 to S1314.

If it is judged in step S1314 that the verification result in step S1313 does not satisfy the detection condition (NO), the data processing unit 122 then returns to step S1311 and repeats the processing of steps S1311 to S1314. If it is judged in step S1304 that the referenced part is at the end of the detection table 314 (YES), the data processing unit 122 terminates the anomaly detection processing (S1316).

Figure 14:
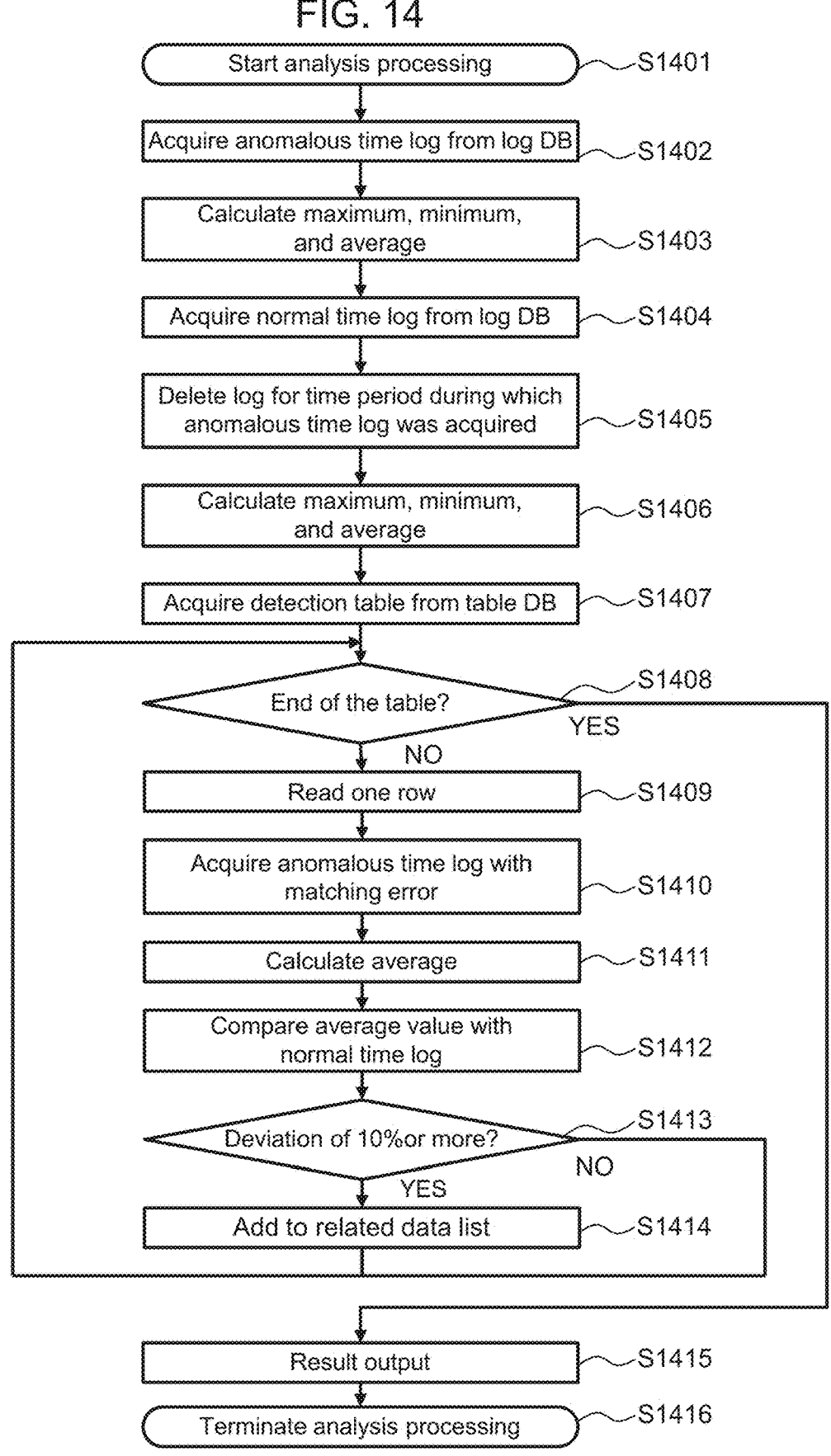
FIG. 14 is a flowchart illustrating analysis processing of an analysis unit of Embodiment 1 according to this invention.

FIG. 14 is a flowchart illustrating analysis processing of the analysis unit of Embodiment 1 according to this invention. This processing is started on condition that the execute analysis button 1104 is selected on the analysis results output screen 1101 and the analysis unit 103 is notified of the target analysis period and the analysis execution by the GUI generation unit 102.

When the analysis unit 103 of the analysis server 101 receives the notification of the target analysis period (the time period from the starting date and time to the ending date and time) and the analysis execution from the GUI generation unit 102, the following processing is started (S1401).

The analysis unit 103 firstly acquires an anomalous time log, in which the error ID is not empty and the time stamp is within the target analysis period, from the log DB105 (S1402), and calculates the maximum, minimum, and average values for each log ID corresponding to the error ID with respect to the acquired anomalous time log (S1403). Under this circumstance, if no anomalous time log exists within the target analysis period, the analysis unit 103 stores empty results in the maximum, minimum, and average values of each log ID.

Next, the analysis unit 103 acquires a normal time log, in which the error ID is empty and the time stamp is within the target analysis period, from the log DB105 (S1404), calculates a time period during which logs are continuously transmitted in every analysis cycle (a period during which an anomalous time log is acquired) by referring to the time stamp of the acquired normal time log, and deletes the anomalous time log within the calculated time period from the normal time log acquired in step S1404 (S1405). Accordingly, it is possible to prevent the normal time log and the anomalous time log from being mixed together as the log within the target analysis period.

Next, the analysis unit 103 calculates the maximum, minimum, and average values for each log ID with respect to the normal time log after the processing of step S1405 (S1406). Under this circumstance, if no normal time log exists within the analysis target period, the analysis unit 103 stores empty results in the maximum, minimum, and average values of each log ID.

Next, the analysis unit 103 acquires the information of the detection table 218 from the table DB 104 (S1407) and executes the processing of step S1408 to step 1413 by referring to the detection table 218 row by row.

The analysis unit 103 checks the referenced part of the detection table 218 and judges whether or not the referenced part is at the end of the table (S1408); and if it is judged in step S1408 that the referenced part is at the end of the table, the analysis unit 103 proceeds to step S1415; and if it is judged in step S1408 that the referenced part is not at the end of the table (NO), the analysis unit 103 reads information of one row from the detection table 218 (S1409).

Next, the analysis unit 103 acquires an anomalous time log, in which the information ("boot") recorded in the detection ID of the detection table 218 matches the information of the error ID information ("boot") read in step S1409, from the anomalous time log acquired in step S1402 (S1410) and calculates the average value for each log ID with respect to the acquired anomalous time log (S1411).

Then, the analysis unit 103 compares the average value of the normal time log calculated in step S1406 with the average value of the anomalous time log calculated in step S1411 (S1412) and judges, based on the comparison result, whether or not there is a deviation of 10% or more between the average value of the normal time log and the average value of the anomalous time log (S1413).

Subsequently, if it is judged that the average value of the anomalous time log deviates from the average value of the normal time log by 10% or more (YES), that is, the average value of the anomalous time log is 10% or more larger or smaller than the average value of the normal time log, the analysis unit 103 proceeds to step S1414; and if it is judged that the average value of the anomalous time log is within 10% of the average value of the normal time log (NO), the analysis unit 103 returns to step S1408 and repeats the processing of steps S1408 to S1413.

In step S1414, the analysis unit 103 adds a combination of the information recorded in the detection ID, regarding which the deviation of 10% or more was found in step S1413 ("boot"), and the collected data ID ("voltage") to a related data list of the detection conditions (anomaly detection conditions) and returns to the processing of step S1408 and repeats the processing of steps S1408 to S1413. The related data list is temporary data managed in the RAM of the analysis server 101 and is deleted when the analysis processing is completed.

On the other hand, if it is judged in step S1408 that the referenced part is at the end of the table, the analysis unit 103 transmits the maximum, minimum, and average values of the anomalous time log calculated in step S1403, the maximum, minimum, and average values of the normal time log calculated in step S1406, the average value of the anomalous time log calculated in step S1411, and the information of the related data list created in step S1413, as the analysis results, to the GUI generation unit 102 (S1415) and then terminates the analysis processing (S1416). Under this circumstance, the analysis unit 103 can also transmit the update prompting information for prompting an update of the various tables to the GUI generation unit 102.

Figure 15:
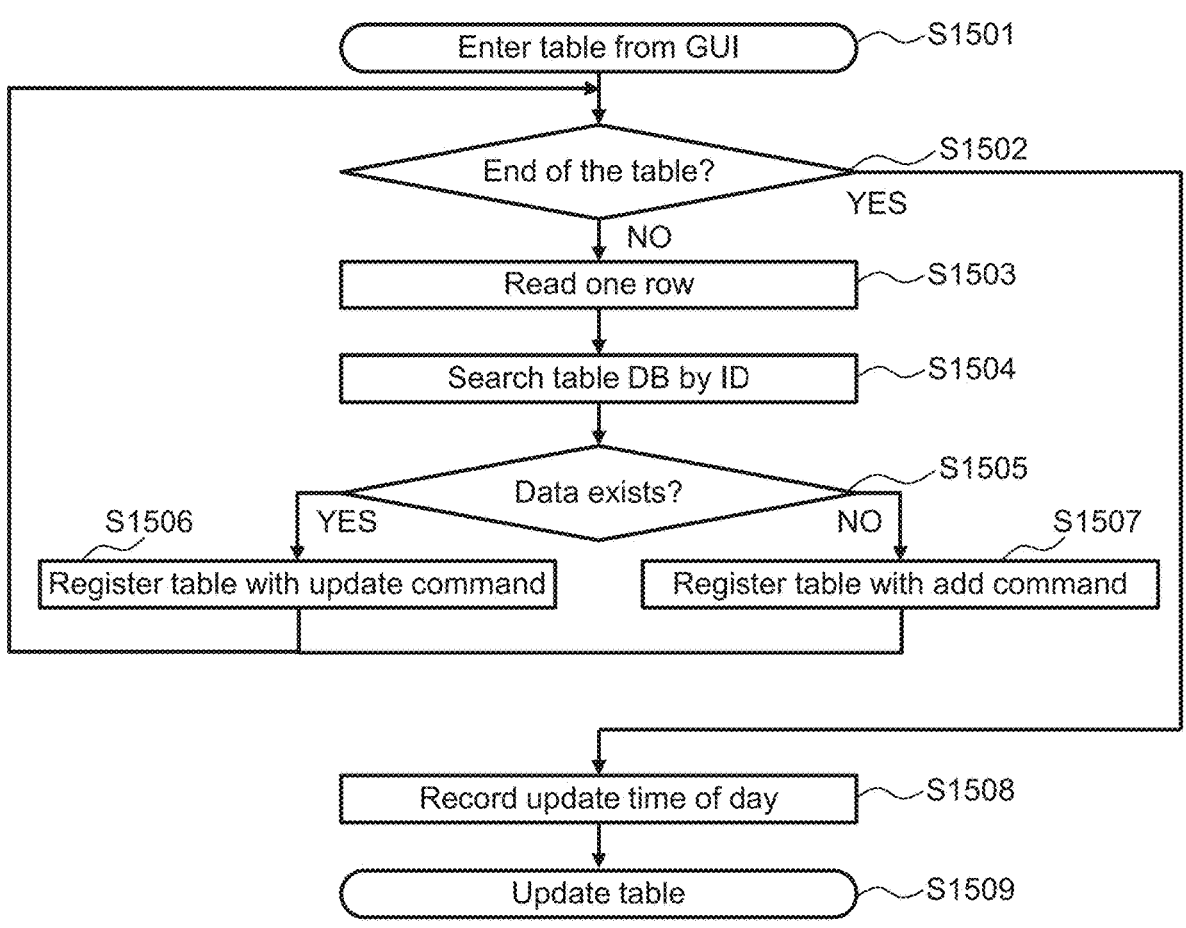
FIG. 15 is a flowchart illustrating table update processing of the GUI generation unit of Embodiment 1 according to this invention.

FIG. 15 is a flowchart illustrating table update processing of the GUI generation unit of Embodiment 1 according to this invention. This processing is started when the user performs the button operations on the collection table setting screen 801, the monitoring table setting screen 901, the detection table setting screen 1001, and the analysis results output screen 1101 and performs the operations to update the various tables.

When the GUI generation unit 102 of the analysis server 101 receives the updated table information as triggered by the button operations on the GUI performed by the user, it executes the processing of step S1502 to step S1506 by referring to the received table information row by row (S1501).

The GUI generation unit 102 checks the referenced part of the table received in step S1501 and judges whether or not the referenced part is at the end of the table (S1502); and if it is judged in step S1502 that the referenced part is at the end of the table (YES), the GUI generation unit 102 proceeds to the processing of step S1508; and if it is judged in step S1502 that the referenced part is not at the end of the table, the GUI generation unit 102 reads the received table information row by row (S1503).

Next, the GUI generation unit 102 searches the relevant table information of the table DB 104 by using the ID of the first row of the table read in step S1503 as a key (S1504). For example, if the received table is the collection table 216, the GUI generation unit 102 searches the information of the collection table 216 by using the information recorded in the data ID ("voltage") as a key. Incidentally, the GUI generation unit 102 performs the same for other tables.

Then, the GUI generation unit 102 judges whether or not data exists based on the search result of step S1504 (S1505); and if it is judged in step S1505 that the data exists (YES), the GUI generation unit 102 executes an information update command on the table DB 104 to update the relevant information in the table DB 104, registers the table according to the information update command (S1506), and then returns to step S1502 and repeats the processing of steps S1502 to S1505. As the GUI generation unit 102 executes the information update command, the information of the row read in step S1503 is updated with the information output as the search result in step S1504.

On the other hand, if it is judged in step S1505 that no data exists (NO), the GUI generation unit 102 executes an information add command on the table DB 104 to add the relevant information to the table DB 104, registers the table with the information add command (S1507), and then returns to step S1502 and repeats the processing of steps S1502 to S1506. As the GUI generation unit 102 executes the information add command, the information of the row read in step S1503 is added to the table DB 104.

On the other hand, if it is judged in step S1502 that the referenced part is at the end of the table (YES), the GUI generation unit 102 updates the last update date and time of the table DB 104 by using the current date and time as an update time of day (S1508), and then terminates the table update processing (S1509).

Figure 16:
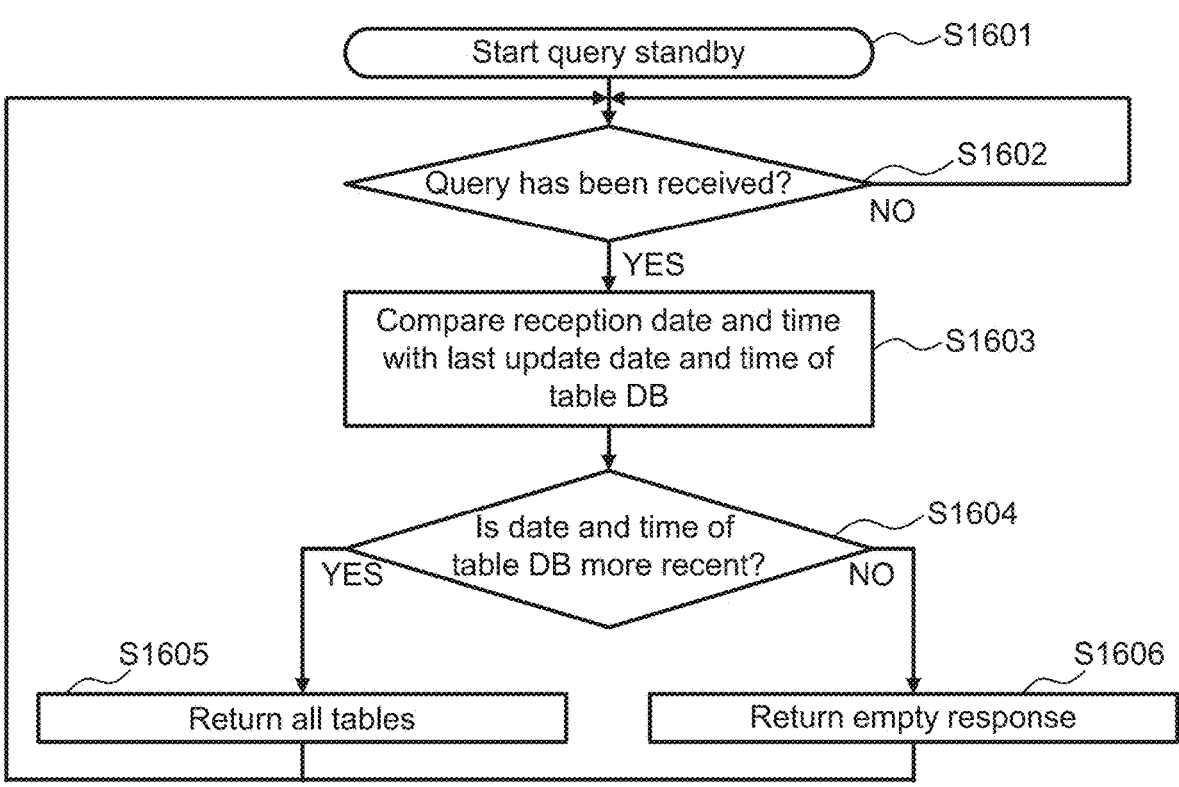
FIG. 16 is a flowchart illustrating query standby processing of a communication unit of Embodiment 1 according to this invention.

FIG. 16 is a flowchart illustrating query standby processing of the communication unit of Embodiment 1 according to this invention. The operation of the communication unit will be described below according to the items of the flowchart.

The communication unit 106 of the analysis server 101 starts the query standby processing by starting the CPU 202 (S1601). Queries that the communication unit 106 waits for are update queries for the various tables and the gateway device 121 makes queries to the analysis server 101 in regular cycles. In this embodiment, as an example, an explanation will be provided about query standby processing of the communication unit 106 where the gateway device

121 is a client and the analysis server 101 is a server via HTTP (Hyper Text Transfer Protocol) communication.

The communication unit 106 also operates as a web server, waits for a query from a client, judges whether or not a query has been received (S1602), and repeats this processing until a query is received (NO); and if it is judged that a query has been received (YES), the communication unit 106 compares the date and time included in the target query data with the last update date and time of the table DB 104 (S1603). Next, based on the comparison result in step S1603, the communication unit 106 judges whether or not the last update date and time of the table DB 104 is more recent than the date and time of reception (S1604); and if it is judged in step S1604 that the last update date and time of the table DB 104 is more recent than the date and time of reception (YES), the communication unit 106 transmits the information of all the tables stored in the table DB 104, for example, the collection table 216, the monitoring table 217, and the detection table 218, to the client as a response to the query (S1605), and then returns to the processing of step S1602 and repeats the processing of steps S1602 to S1604.

On the other hand, if it is judged in step S1604 that the last update date and time of the table DB 104 is not more recent (i.e., older) than the date and time of reception (NO), the communication unit 106 transmits an empty response to the client as a response to the query (S1606) and then returns to the processing of step S1602 and repeats the processing of steps S1602 to S1604.

Figure 17:
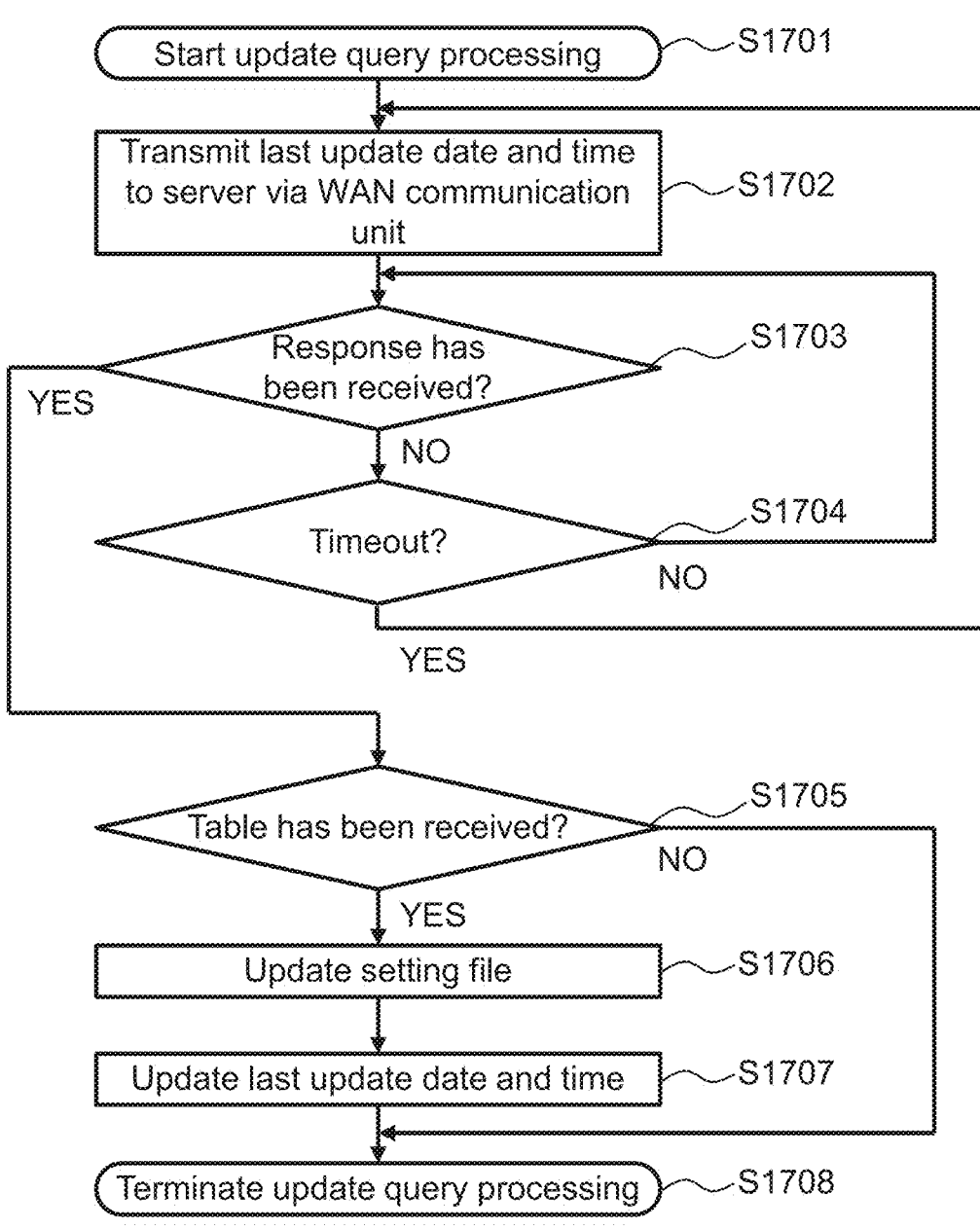
FIG. 17 is a flowchart illustrating update query processing of the data processing unit of Embodiment 1 according to this invention.

FIG. 17 is a flowchart illustrating update query processing of the data processing unit of Embodiment 1 according to this invention. The operation of the data processing unit will be described below according to the items of the flowchart.

The data processing unit 122 of the gateway device 121 starts the update query processing in preset cycles (S1701). The update query processing by the data processing unit 122 is processing executed cyclically and the cycle is preset when the gateway device 121 is shipped.

Next, the data processing unit 122 transmits the information of the last update date and time to the analysis server 101 as information of an update query via the WAN communication unit 123 (S1702). In this embodiment, as an example, the HTTP POST method is used to transmit the last update date and time.

Then, after transmitting the information of the last update date and time to the analysis server 101, the data processing unit 122 waits for a response from the analysis server 101 and judges whether or not the response has been received (S1703); and if it is judged in step S1703 that the response has not been received (NO), the data processing unit 122 judges whether or not a timeout period has elapsed (S1704); and if it is judged in step S1704 that the timeout period has not elapsed (NO), the data processing unit 122 returns to the processing of step S1703 and repeats the processing of steps S1703 to S1704; and if it is judged in S1704 that the timeout period has elapsed (YES), the data processing unit 122 returns to the processing of step S1702 and repeats the processing of steps S1702 to S1703.

On the other hand, if it is judged in step S1703 that the response has been received (YES), the data processing unit 122 judges whether or not it has received the table information as a response from the analysis server 101 (S1705).

If it is judged in step S1705 that the table information has not been received from the analysis server 101 (NO), the data processing unit 122 proceeds to the processing of step S1708; and if it is judged in step S1705 that the information of the tables (the collection table 216, the monitoring table 217, and the detection table 218) has been received from the analysis server 101 (YES), the data processing unit 122 replaces the tables stored in the setting file 124 (the collection table 312, the monitoring table 313, and the detection table 314) with the tables received in step S1703 (the collection table 216, the monitoring table 217, and the detection table 218) to update the table information stored in the setting file 124 (S1706), update the content of the last update date and time 315 of the setting file 124 with the current time of day (S1707), and then terminates the update query processing (S1708). Incidentally, the data processing unit 122 repeats the similar processing with the content of the updated tables. For example, the data processing unit 122 executes the processing repeatedly in every preset cycle; and every time each processing terminates, the data processing unit 122 transmits the information of the update query to the analysis server 101 via the WAN communication unit 123. On condition that the communication unit 106 has received the information of the update query, the analysis server 101 transmits the updated server judgement rule information as response information to the update query to the gateway device 121 via the communication unit 106. Accordingly, the gateway device 121 and the analysis server 101 can execute the processing repeatedly in every preset cycle.

In Embodiment 1, the gateway device 121 transmits the anomalous time data including anomaly content and the normal time data to the analysis server 101 based on the table data group stored in the setting file 124 (the collection table 312, the monitoring table 313, the detection table 314, and the last acquisition date and time 315). Under this circumstance, at the beginning of the system operation, information of all the data that can be collected is described in the collection table 312, and the monitoring table 313 and the detection table 314 are set so as to detect a wide range of anomalies. For example, a decrease in the memory amount, a rise in the temperature, and the occurrence of reboot which may occur due to various causes will be targets to be monitored. In addition, a threshold value which will make the detection occur easily is set so that data can be collected. Specifically, for example, when a rise in the temperature is to be detected, the threshold value may be set at 55 degrees for the local equipment 131 regarding which a temperature rise of 50 degrees at normal time and an average of 15 degrees upon the occurrence of anomaly are expected. Then, the detection ID (such as "boot") is assigned to each of these monitoring conditions to collect as many data as possible and transmit the collected data to the analysis server 101.

The analysis server 101 analyzes the data transmitted from the gateway device 121 to visualize the data indicating a behavior different from the normal time (anomalous time data) and transmits information indicating the tendency analysis of each piece of collected data and information for promoting an efficient table update to the gateway device 121.

As one case, data leading to the cause identification can be identified regarding an anomaly with various possible occurrence causes. For example, it can be identified that the number of rotations, the supply voltage, and the operating time are closely related to the temperature rise.

Moreover, a specific value can be acquired for the threshold value used for monitoring. For example, even when the temperature at normal time varies depending on the installation location of the local equipment 131, the threshold value can be reset based on the maximum, minimum, and average values of temperature data for each installation location of the local equipment.

In addition, even if the detected anomaly has occurred secondarily due to another anomaly, data identifying the original cause can also be acquired. For example, it may be a case where an anomalous rise in the number of rotations can be visualized from data collected as triggered by the detection of a rise in the temperature.

When the relationship between the anomaly and the data is clarified as described above, the user can update the table information in consideration of such relationship. The updated table information is also distributed from the analysis server 101 to the gateway device 121, and it becomes possible to detect an unexpected anomaly (an anomaly other than anomalies which are set in the gateway device 121) or an anomaly according to the installation environment of the local equipment 131.

According to this embodiment, it is possible to detect any anomaly/anomalies of the monitored object, which were incorporated into the judgement rules in advance. Specifically speaking, it is designed to detect an anomaly/anomalies of the local equipment 131 by combining the anomaly detection by the gateway device 121 and the anomaly detection by the analysis server 101, so that it is possible to detect an anomaly/anomalies of the local equipment 131. Moreover, according to this embodiment, information is transmitted and received between the detection gateway device 121 and the analysis server 101 for every fixed time period and the processing for updating the various tables is repeated, so that the judgement rules can be updated continuously. Furthermore, when the various tables stored in the gateway device 121 are updated by replacing the various tables stored in the gateway device 121 with the various tables transmitted from the analysis server 101, the update content of the various tables stored in the gateway device 121 (update IDs and data types) is narrowed down to the content required for the anomaly detection and any content that is unnecessary for the anomaly detection is deleted and, as a result, the judgement rules can be efficiently updated.

Moreover, when the gateway device 121 transmits the transmission data 701 to the analysis server 101, the identification information of an empty character string is added to the error ID in the normal time data among the equipment data and the identification information such as "boot" is added to the error ID in the anomalous time data, so that when the analysis server 101 analyzes the transmission data 701, it can judge whether or not the data is anomalous, based on the identification information added to the transmission data 701. Incidentally, although the method of comparing the average values is used as the analysis method as an example in Embodiment 1, there are also other methods such as a method of calculating an average value and a variance for each piece of data and extracting data closely related to the anomaly based on a deviation from the data distribution. Consequently, in Embodiment 1, it is possible to output the detected information in the format that enables the user to easily refer to the information according to certain rules, regardless of the analysis method.

Embodiment 2

Embodiment 1 adopts the method by which the gateway device 121 transmits the normal time data together with the anomalous time data to the analysis server 101 and the analysis server 101 compares the normal time data with the anomalous time data at the time of the analysis. However, when this method is applied to a system that transmits and receives data via a network such as the mobile communication network 111 that has a limited communication volume within a certain period of time, an increase in the data volume becomes the issue.

Therefore, in Embodiment 2, an explanation will be provided about a method for acquiring the normal time data via a network that is different from the mobile communication network 111 and has no limitation on the communication volume within a certain period of time, for example, a wired network that is not a pay-as-you-go system or has no limit on the maximum communication volume per month, and uploading the data acquired via this network to the analysis server 101.

Figure 18:
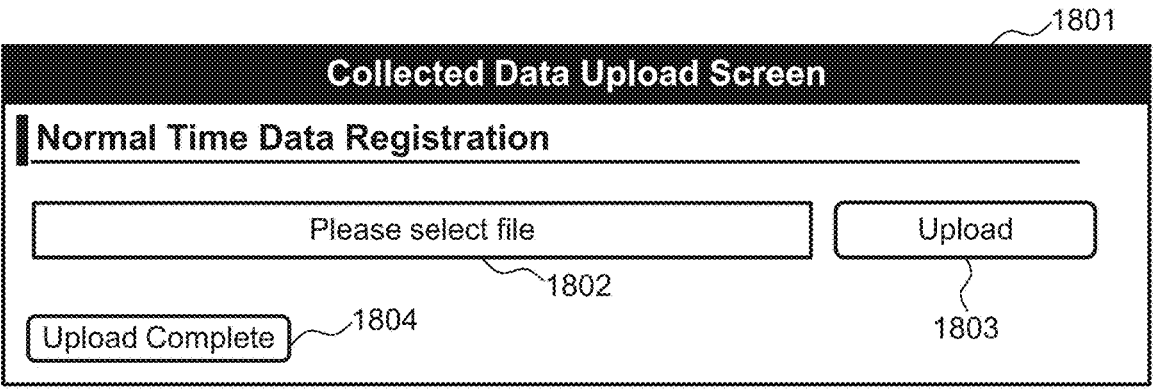
FIG. 18 is a screen configuration diagram illustrating a collected data upload screen of Embodiment 2 according to this invention.

FIG. 18 is a screen configuration diagram illustrating a collected data upload screen of Embodiment 2 according to this invention. In FIG. 18, a collected data upload screen 1801 is generated by the GUI generation unit 102 and is displayed on a PC screen by the user accessing the analysis server 101 from a PC (Personal Computer) with a browser.

The collected data upload screen 1801 of the PC is configured of a file selection box 1802, an upload button 1803, and an upload complete button 1804. When the file selection box 1802 is selected, the file selection box 1802 displays information about files stored on the PC accessed by the user. When the displayed file is selected, the file selection box 1802 displays a file path to the selected file.

The upload button 1803 is a button for, when selected, uploading information of the file selected in the file selection box 1802 to the analysis server 101. The user can also upload information of a plurality of files to the analysis server 101 by repeating the operation of selecting and uploading the files. The file uploaded by this operation is a file in the format such that the transmission data 701 in FIG. 7 is connected. The information of the file uploaded by the operation of the upload button 1803 (normal time data) is stored in the log DB 105 by the GUI generation unit 102.

The upload complete button 1804 is a button for, when selected, closing the collected data upload screen 1801.

In Embodiment 2, the analysis server 101 can import the normal time data acquired from the outside (the user's PC) via the GUI generation unit 102. Under this circumstance, the WAN communication unit 123 transmits the judgement result indicating the anomaly of the equipment data among the judgement results of the data processing unit 122 and the anomalous time data judged to be anomalous by the data processing unit 122 among the equipment data as transmission data to the analysis server 101 via the mobile communication network 111. The GUI generation unit (input-output unit) 102 of the analysis server 101 inputs the normal time data corresponding to the equipment data judged to be normal by the data processing unit 122 among the equipment data added to the transmission data via a network (wired network) different from the mobile communication network 111, and transfers the input normal time data to the analysis unit 101.

Incidentally, for example, data acquired from the local equipment 131 for a long period of time in a test environment in advance before the shipment of the local equipment 131 may be substituted for the normal time data.

According to this embodiment, the normal time data is collected from the user's PC via the wired network without the intervention of the mobile communication network 111, so that it becomes possible to suppress an increase in the data volume in the mobile communication network 111.

Embodiment 3

With the analysis system according to Embodiments 1 and 2, it is necessary to update the tables with the help of the user after the operation is started. Under this circumstance, if the user is a maintenance person outside the relevant department who is not familiar with the local equipment 131, the policies for updating the tables may not be determined and the maintenance level may degrade.

Therefore, in Embodiment 3, an analysis system that automatically updates the threshold value and the judgement content for each monitoring ID registered for each detection table will be described.

Figure 19:
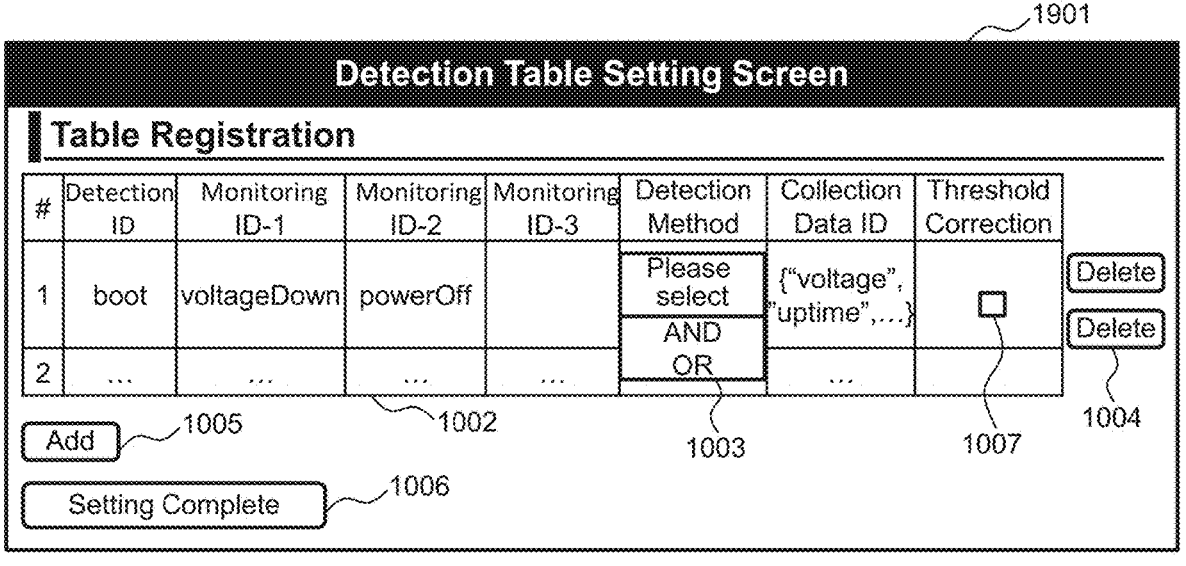
FIG. 19 is a screen configuration diagram illustrating a detection table setting screen of Embodiment 3 according to this invention.

FIG. 19 is a screen configuration diagram illustrating a detection table setting screen in Embodiment 3 according to this invention. In FIG. 19, a detection table setting screen 1901 of Embodiment 3 is configured so that a check box 1007 for deciding whether or not to perform a threshold determination is added to the detection table setting screen 1001 in FIG. 10. When the content of the setting table 1002 is registered in the state where the check box 1007 is selected, the threshold correction is enabled.

Figure 20:
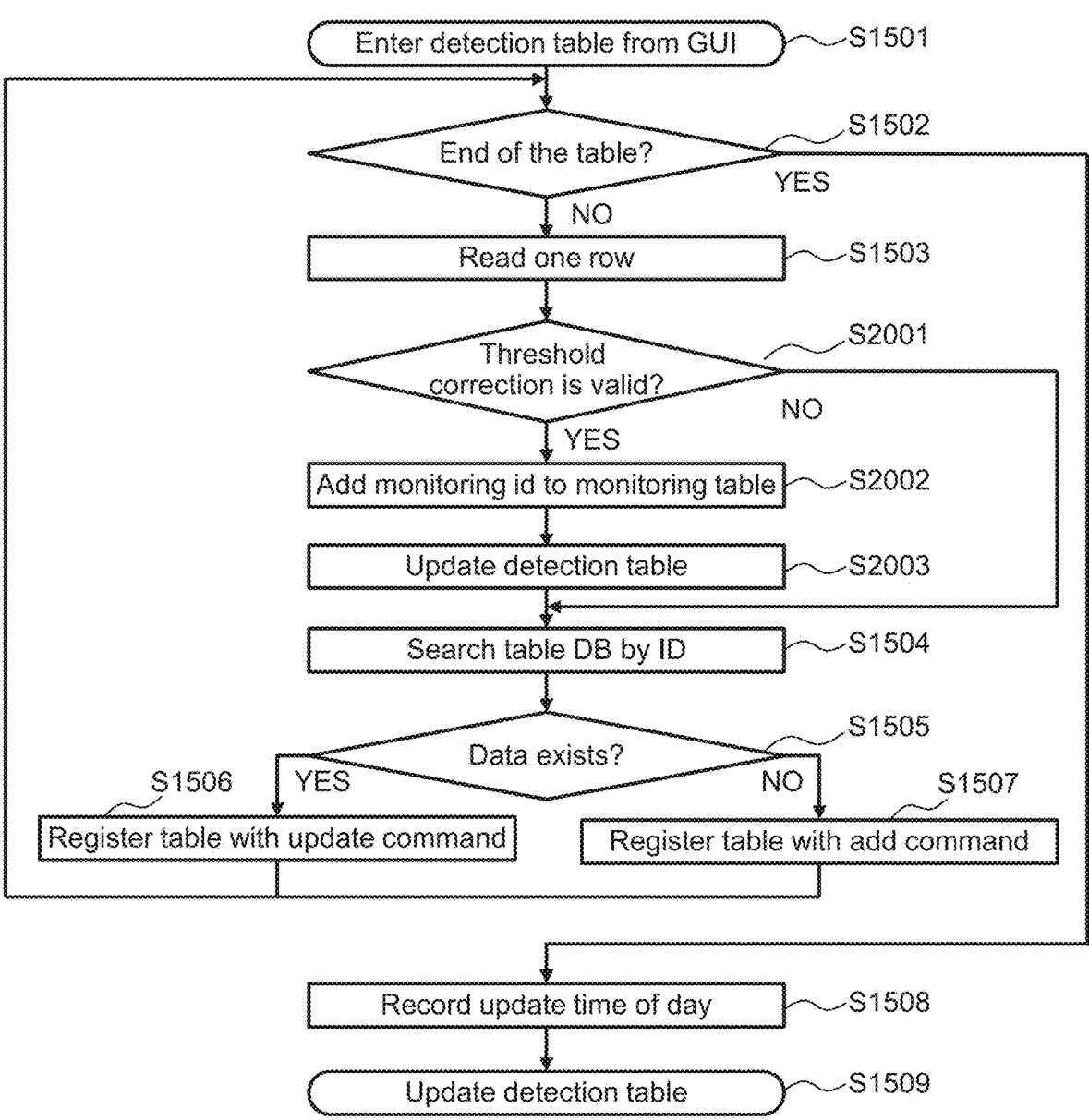
FIG. 20 is a flowchart illustrating detection table update processing of the GUI generation unit of Embodiment 3 according to this invention.

FIG. 20 is a flowchart illustrating detection table update processing of the GUI generation unit according to Embodiment 3. In FIG. 20, the detection table update processing according to Embodiment 3 adds processing of steps S2001 to S2003 between steps S1503 and S1504 of the table update processing in FIG. 15 and only the added processing will be described below.

Regarding the row read in step S1503, the GUI generation unit 102 judges whether or not the threshold correction is valid (S2001); and if it is judged in step S2001 that the threshold correction is not valid (NO), the GUI generation unit 102 proceeds to step S1504. If the check box 1007 is operated and it is judged in step S2001 that the threshold correction is valid (YES), the GUI generation unit 102 needs to consider that the monitoring ID registered in the detection table 218 is not shared with other detection tables, so the GUI generation unit 102 adds a new monitoring ID to the monitoring table 217 and uses the currently registered content, except for the monitoring ID (S2002).

Under this circumstance, the value of the monitoring ID is a name to associate the monitoring ID ("Voltage Down") with the detection ID ("boot"), for example, "Voltage Down_for_boot." When a plurality of monitoring IDs are registered, the same operation is performed for all monitoring IDs.

Next, the GUI generation unit 102 updates the information of the detection table 218 by changing the monitoring ID name of the read detection table 218 to the value of the monitoring ID added in step S2002 (S2003), and then proceeds to the processing of step S1504. Under this circumstance, if the information indicating a change of the anomaly detection condition defined by the server judgement rules exists in the input information by the user's operation, the GUI generation unit 102 updates the anomaly detection condition in the server judgement rules. Moreover, if the collected data ID of the detection table 218 does not include the data ID ("voltage") of the monitored object recorded in the monitoring table 217 in step S2002, the GUI generation unit 102 adds the information of the data ID of the monitored object to the collected data ID.

Figure 21:
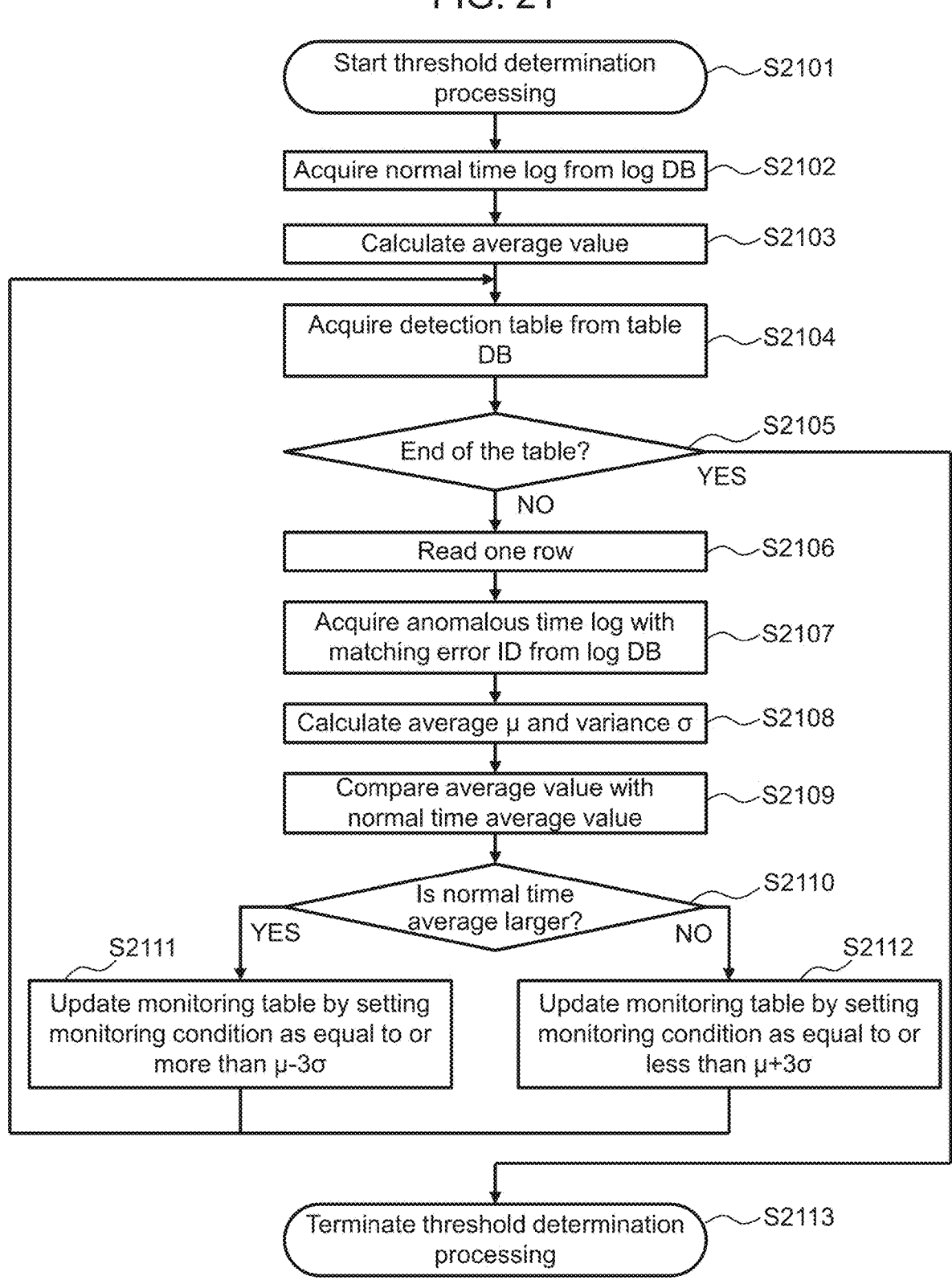
FIG. 21 is a flowchart illustrating threshold value determination processing of the analysis unit of Embodiment 3 according to this invention.

FIG. 21 is a flowchart illustrating threshold value determination processing of the analysis unit in Embodiment 3 according to this invention. The operation of the analysis unit will be described below according to the items of the flowchart.

The analysis unit 103 of the analysis server 101 starts the threshold value determination processing in every preset cycle (S2101) and acquires a normal time log from the log DB 105 (S2102). Under this circumstance, in Embodiment 2, the normal time log to be targeted is a normal time log imported from the outside of the analysis server 101. If there is a possibility that the normal time log and the anomalous time log may be mixed together as in Embodiment 1, processing similar to that of step S1405 in FIG. 14 is performed to remove the normal time log during the time period when the anomalous time log was acquired.

Next, the analysis unit 103 calculates an average value of the normal time log acquired in step S2102 (S2103), then acquires the information of the detection table 218 from the table DB 104 (S2104), and executes processing of steps S2105 to S2112 by referring to the information of the detection table 218 row by row. The analysis unit 103 checks the referenced part of the detection table 218 acquired in step S2104 and judges whether or not the referenced part is at the end of the table (S2105); and if it is judged in step S2105 that the referenced part is not at the end of the table (NO), the analysis unit 103 reads information of one row from the detection table 218 (S2106) and acquires data (anomalous time log) regarding which the detection ID of the detection table 218 ("boot") matches the error ID ("boot") from the log DB 105 (S2107).

Next, the analysis unit 103 calculates an average u and a variance σ with respect to the data (anomalous time log) acquired in step S2107 (S2108). The object of the calculation is the data recorded in the collected data ID of the detection table 218 and is the data (log) recorded in the reference data ID of the monitoring table 217. If a plurality of pieces of data are objects to be calculated, the average μ and the variance σ are calculated for each piece of data.

Then, the analysis unit 103 compares the average μ of the anomalous time log calculated in step S2108 with the average value of the normal time log calculated in step S2103 to check which of them is larger or smaller than the other average value (S2109) and judges whether or not the average value of the normal time log is larger than the average μ of the anomalous time log (S2110).

Subsequently, if it is judged in step S2110 that the average value of the normal time log is larger than the average value u of the anomalous time log (YES), the analysis unit 103 sets the comparison method for the row of the monitoring condition described in the monitoring ID in the monitoring table 217 to "<=(equal to or less than)" and sets the threshold value to "μ+3σ" to update the information of the monitoring table 217, and returns to the processing of step S2104 and repeats the processing of steps S2104 to S2110.

On the other hand, if it is judged in step S2110 that the average value of the normal time log is smaller than the average value u of the anomalous time log (NO), the analysis unit 103 sets the comparison method for the row of the monitoring condition described in the monitoring ID in the monitoring table 217 to ">=(equal to or more than)" and sets the threshold value to "μ−3σ" to update the information of the monitoring table 217, and returns to step S2104 and repeats the processing of steps S2104 to S2110. Incidentally, if the calculation is performed and targeted on a plurality of pieces of data in step S2108, the processing of steps S2110 to S2112 is performed for each piece of data as the objects to be calculated.

If it is judged in step S2105 that the referenced part is at the end of the table, the analysis unit 103 terminates the threshold value determination processing (S2113).

In Embodiment 3, the analysis server 101 performs processing for automating the determination of the threshold value. Specifically speaking, the analysis server 101 compares the normal time data judged to be normal by the data processing unit 122 among the equipment data belonging to the transmission data with the anomalous time data defined as the object to be collected for the anomaly detection condition of the detection table 218 among the anomalous time data judged to be anomalous by the data processing unit 122, and updates the monitoring condition defined by the server judgement rules based on this comparison result (the threshold value of the monitoring table 217). Moreover, in Embodiment 3, statistical values of the data are calculated regarding each detection ID and the threshold value is automatically determined in the format such that the detection range is an average μ+3σ where 99% or more of the anomalous time data is expected to be present. There are other possible methods such as a method for determining the threshold value by simply taking the exact intermediate value between the average value at normal time and the average value of the data collected with the detection ID.

Moreover, in Embodiment 3, the processing of adding the monitoring table which is the threshold determination automation object to be performed in step S2002 of FIG. 20 and adding the threshold value judgement object data to be performed in step S2003 of FIG. 20 to the collected data ID at the time of detection is important and it does not depend on the threshold update method.

According to this embodiment, the judgement threshold is updated cyclically and automatically by the analysis server 101, so that it is possible to prevent the degradation in the level of maintenance that can occur when a person who has no knowledge of the analysis system 10 or the local equipment 131 is in charge of maintenance.

Embodiment 4

With the analysis system according to Embodiments 1 to 3, it is necessary to perform the initial setting of each table and the updating of the tables in the middle of the process through human intention. Therefore, the relationship between the data which cannot be understood intuitively by humans and the anomaly/anomalies cannot be reflected in the tables.

Therefore, in Embodiment 4, an explanation will be provided about an analysis system where the calculation using a neural network, which is a machine learning technique, is introduced into the analysis unit 103 and the data processing unit 122.

Figure 22:
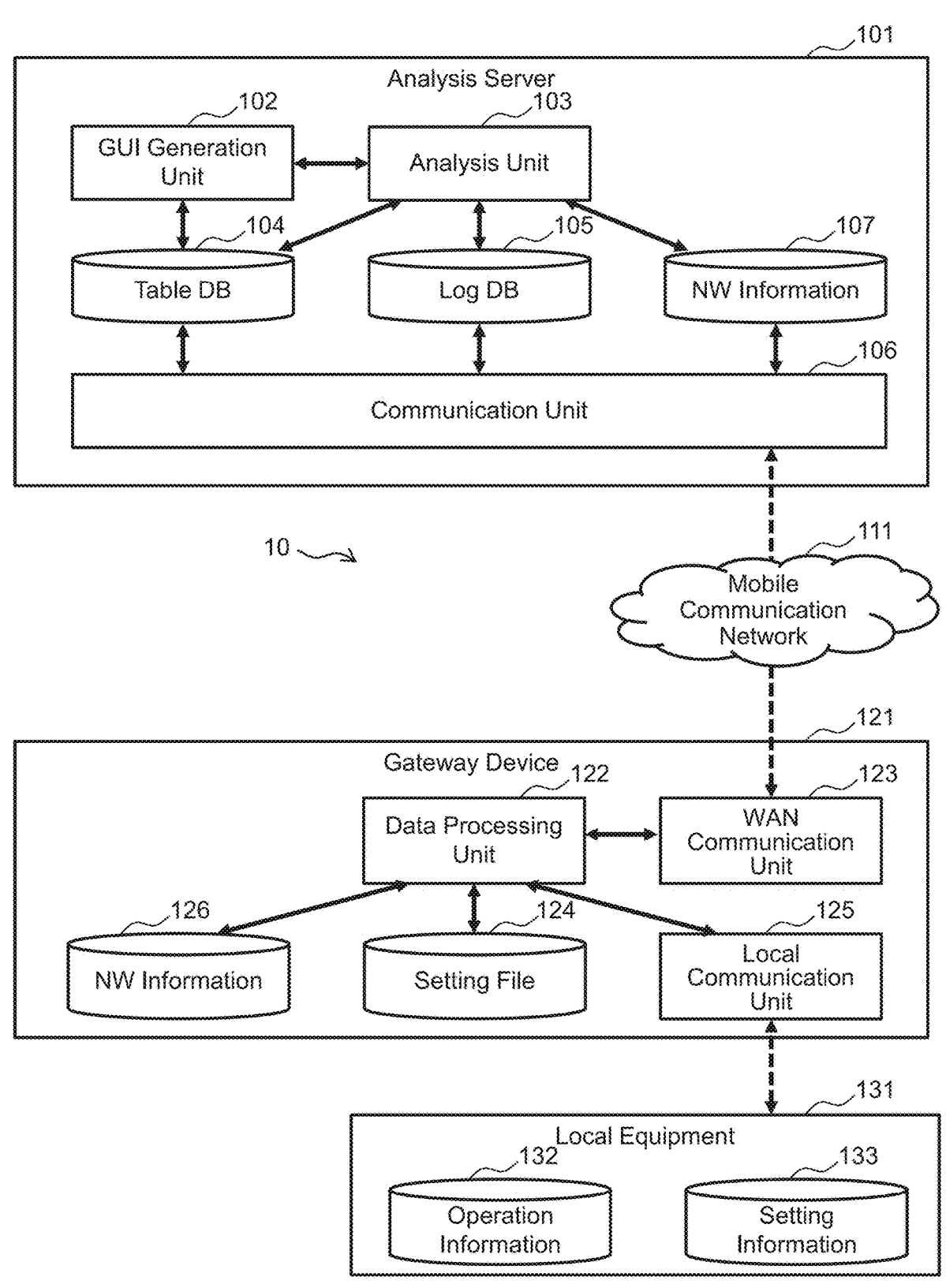
FIG. 22 is a block diagram illustrating an overall configuration of an analysis system of Embodiment 4 according to this invention.

FIG. 22 is a block diagram illustrating an overall configuration of the analysis system of Embodiment 4 according to this invention. In Embodiment 4, NW information 107 is added to the analysis server 101 and NW information 126 is added to the gateway device 121 in the analysis system in FIG. 1. The NW information 107 and 126 is information that is necessary for the calculation of the neural network used in Embodiment 4 and is regularly updated by the analysis unit 103. The updated content of the NW information 107 and 126 is transmitted from the analysis server 101 to the gateway device 121 by regular query processing in a way similar to that of the various tables.

Figure 23:
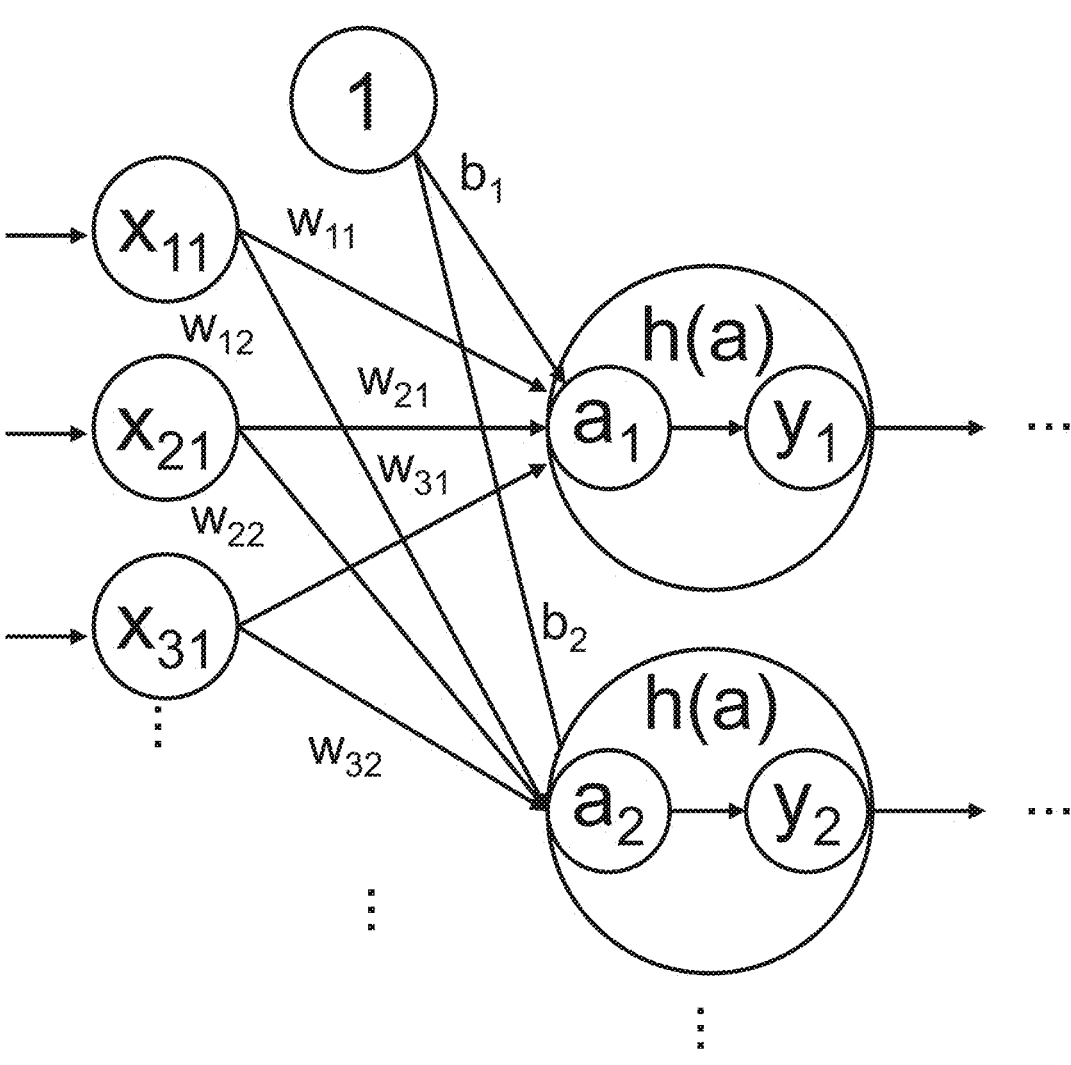
FIG. 23 is a schematic diagram illustrating the content of NW information of Embodiment 4 according to this invention.

FIG. 23 is a schematic diagram illustrating the content of the NW information of Embodiment 4 according to this invention. The structure and parameters of the NW are information included in the NW information. Regarding the structure of the NW in this information, the analysis unit 103 is provided with the parameters as set values in advance and practically only the parameters are updated. The parameters consist of weights $w_{11}$, $w_{12}$, $w_{21}$, $w_{22}$, $w_{31}$, and $w_{32}$ and biases $b_1$ and $b_2$. The weights $w_{11}$ to $w_{32}$ are coefficients multiplied by the respective layers of the NW. The biases $b_1$ and $b_2$ are values added to the respective layers of the NW.

In the neural network, in units called perceptrons, input values $X_{11}$, $X_{21}$, and $X_{31}$ are multiplied by the weights $w_{11}$ to $w_{32}$ and then the biases $b_1$ and $b_2$ are added to obtain intermediate outputs $a_1$ and $a_2$. The calculated results are then assigned to a function called an activation function $h(a)$ to obtain outputs $y_1$ and $y_2$. By using the then-obtained outputs $y_1$ and $y_2$ as inputs of the next perceptrons, the calculation goes through a plurality of perceptrons and proceeds to outputs.

The structure of the above-described network mainly refers to a combination of perceptrons and the calculation content of the network is determined by arranging, for example, three perceptrons in a first layer and four perceptrons in a second layer. In the neural network of Embodiment 4, the values acquired via all perceptrons are converted into, and output as, probabilities belonging to the respective detection IDs when collecting data. Therefore, the input to this network is data acquired from the local equipment 131 and the output from the network is a probability of each detection ID. For example, when the data are collected, the output is obtained such that the probability that the data may include anomalies of "boot" is "80%," and the probability that anomalies of "overheat" may occur is "10%," and the probability that the data may be normal is "10%."

Figure 24:
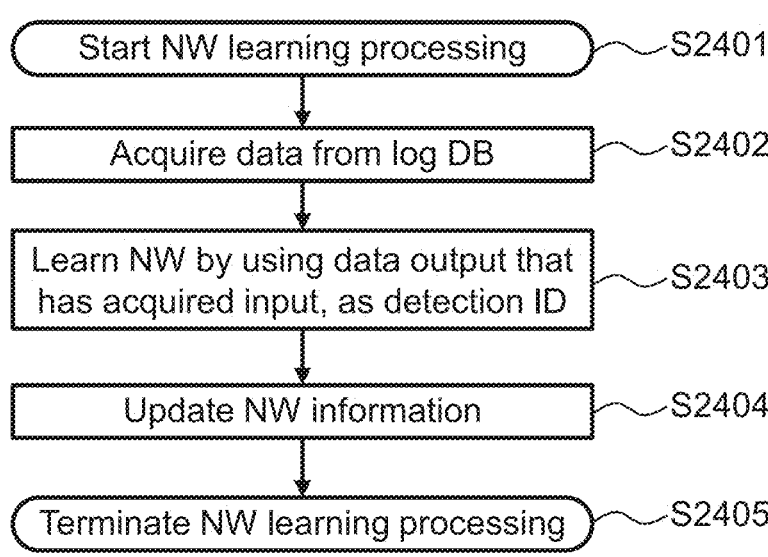
FIG. 24 is a flowchart illustrating NW learning processing of the analysis unit of Embodiment 4 according to this invention.

FIG. 24 is a flowchart illustrating NW learning processing of the analysis unit of Embodiment 4 according to this invention. The operation of the analysis unit will be described below according to the items of the flowchart.

The analysis unit 103 of the analysis server 101 is started by the CPU 202 in preset cycles to start the NW learning processing (S2401) and acquires data stored in the log DB 105 from the log DB 105 within a certain period of time preset in the analysis unit 103 (S2402).

Next, the analysis unit 103 performs the NW parameter learning in consideration of the fact that the data acquired from the log DB 105 stores the data to be collected for each detection ID (equipment data) and also stores the information of the detection ID under the name of the error ID, by using the collected data (equipment data) as an input and by using the probability applied to the status of each detection ID as an output (S2403). Incidentally, regarding the data which is not described in the collected data ID for each detection ID, its value is input as "0." Under this circumstance, it is assumed that the structure and hyperparameters of the NW are assigned to the analysis unit 103 in advance. For the NW learning, a method such as an error backpropagation method used for learning a general neural network is used.

Next, the analysis unit 103 updates the NW information 107 to the parameter values obtained as the result of learning in step S2403 (S2404). Under this circumstance, the analysis unit 103 simultaneously distributes the updated parameters at the time of query from the gateway device 121, so that the last update date and time is set to the current time of day.

Subsequently, the analysis unit 103 terminates the NW learning processing on condition that the NW information 107 has been updated (S2405).

Figure 25:
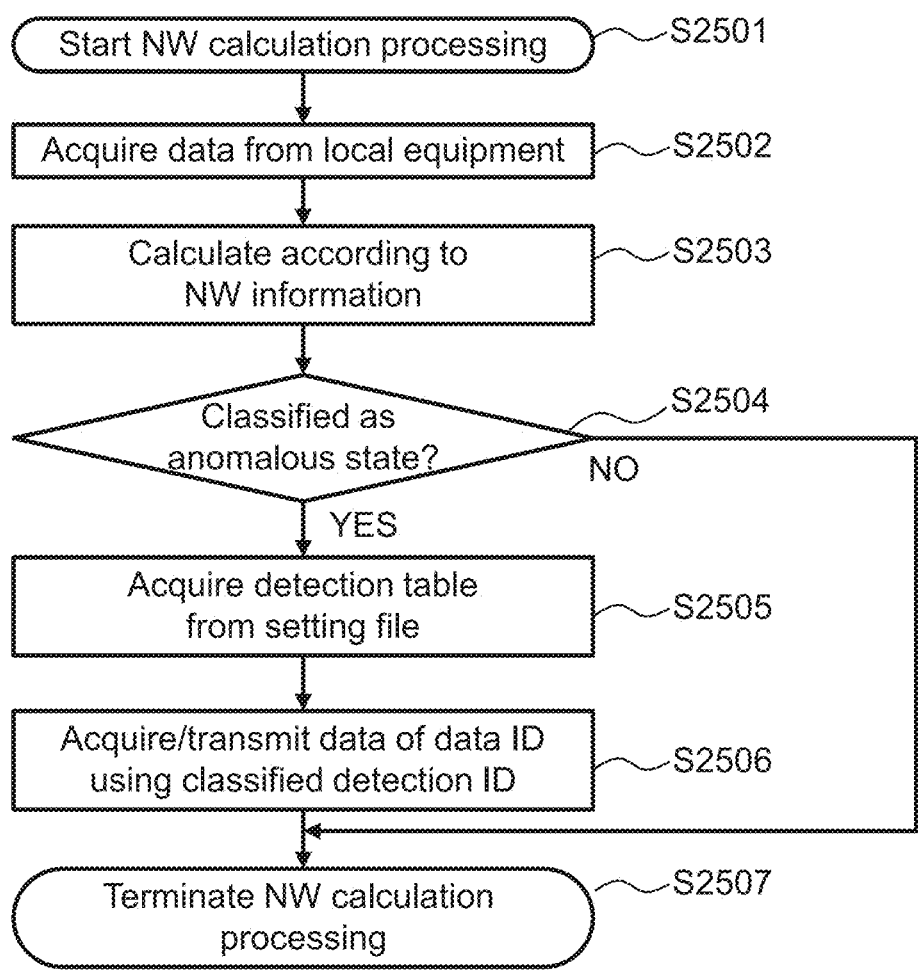
FIG. 25 is a flowchart illustrating NW calculation processing of the data processing unit of Embodiment 4 according to this invention.

FIG. 25 is a flowchart illustrating NW calculation processing of the data processing unit of Embodiment 4 according to this invention. The operation of the data processing unit will be described below according to the items of the flowchart.

The data processing unit 122 of the gateway device 121 starts the NW calculation processing in every preset cycle (S2501), acquires all the data described in the collection table 312 from the local equipment 131, gives the data acquired in step S2502 as input to the current NW, and performs calculation according to the NW information 126 (S2503). Under this circumstance, the current NW is the NW in which the parameters acquired by the query processing regularly performed by the gateway device 121 on the analysis server 101 are reflected. The values of weights and biases and the structure of the NW are stored as the parameters and the outputs are obtained when the inputs are given.

Next, the data processing unit 122 refers to the output obtained by the processing of step S2503 and judges whether or not the processing result of step S250 is classified as an anomalous state (S2504). Under this circumstance, the output obtained in the processing of step S2503 is the probability belonging to each detection ID (or normal state) and the state with the highest probability becomes the current state.

Then, if it is judged in step S2504 that the output is classified as any one of the detection IDs (YES), the data processing unit 122 acquires the information of the detection table 314 from the setting file 124 (S2505), acquires the data of the collected data ID 313d ("voltage" and "uptime") with the detection ID classified in step S2504 ("boot") based on the acquired information of the detection table 314, and transmits the acquired data to the analysis server 101 (S2506).

If it is judged in step S2504 that the output is not classified as any one of the detection IDs (NO) or if the processing of step S2506 is completed, the data processing unit 122 terminates the NW calculation processing (S2507).

In this embodiment, the neural network shared by the analysis unit 103 and the data processing unit 122 learns by using the data aggregated in the log DB105 by using the collected data as the input and the detection ID of the detection table as the output.

According to this embodiment, the neural network automatically learns the relationship between the data and anomalies without human intervention, so that it becomes possible to detect an anomaly/anomalies based on the relationship between the data which cannot be understood intuitively by humans and the anomaly/anomalies.

Embodiment 5

The analysis system according to Embodiments 1 to 4 collects data from only the local equipment 131. Therefore, it is not possible to detect an anomaly/anomalies caused by any malfunction(s) of the gateway device 121 or any change(s) in the communication status. For example, if the local communication unit 125 fails and data from the local equipment 131 cannot be collected, that anomaly cannot be reported to the analysis server 101.

Therefore, the gateway device 121 of Embodiment 5 collects, in addition to the data equipment data from the local equipment 131, data indicating the anomalous state of the gateway device itself and the anomalous state of the communication path between the gateway device 121 and the local equipment 131 (data collected inside the gateway device 121) as internal data and transmits the collected internal data to the analysis server 101. Under this circumstance, the data processing unit 122 adds the internal data collected inside the gateway device to the transmission data. When the analysis server 101 becomes capable of analyzing the internal data and detecting anomalies of the gateway device itself, even if it becomes difficult to collect data from the local equipment 131, it becomes possible to detect any malfunction(s) of the gateway device 121 and an anomaly/anomalies caused by any change(s) in the communication status. In addition, as the number of motor rotations of the local equipment 131 rises, noise is generated, this noise affects the local communication unit 125, and there are some cases where the communication fails, so that it is possible to detect the relationship between the number of motor rotations and the communication quality by having the analysis server 101 analyze the data including the noise collected inside the gateway device 121 as the internal data and, as a result, it becomes possible to recognize that the cause of the anomaly is the motor.

According to this embodiment, it becomes possible to detect a malfunction(s) of the gateway device(s) 121 and an anomaly/anomalies caused by any change(s) in the communication status between the gateway device(s) 121 and the local equipment 131.

Incidentally, this invention is not limited to the aforementioned embodiments, but includes various variations and equivalent configurations within the gist of the scope of the claims attached hereto. For example, the functions of the WAN communication unit 123 and the local communication unit 125 can be added to the data processing unit 122 by integrating the data processing unit 122, the WAN communication unit 123, and the local communication unit 125. Moreover, the function of the communication unit 106 can be added to the analysis unit 103 by integrating the analysis unit 103 and the communication unit 106. Furthermore, the function of the communication unit 106 can be added to the GUI generation unit 102 by integrating the GUI generation unit 102 and the communication unit 106. The aforementioned embodiments have been described in detail in order to explain this invention in an easily comprehensible manner, and this invention is not necessarily limited to those having all the described configurations.

Moreover, part or all of the aforementioned respective configurations, functions, etc. may be implemented by hardware by, for example, designing them in integrated circuits or may be implemented by software by processors interpreting and executing programs for realizing the respective functions.

Information such as programs, tables, and files that implement each of the functions can be stored in memories, storage devices such as hard disks and SSDs (Solid State Drives), or recording media such as IC (Integrated Circuit) cards, SD (Secure Digital) cards, and DVDs (Digital Versatile Discs).

REFERENCE SIGNS LIST

10: analysis system
101: analysis server
102: GUI generation unit
103: analysis unit
104: table DB
105: log DB
106: communication unit
111: mobile communication network
121: gateway device
122: data processing unit
123: WAN communication unit
124: setting file
125: local communication unit
131: local equipment
132: operation information
133: setting information
201: CPU
202: main storage apparatus
203: auxiliary storage I/F 204: input-output I/F
205: network I/F
210: auxiliary storage apparatus
211: DBMS
213: local equipment operation information
214: local equipment setting information
216: collection table
217: monitoring table
218: detection table
219: last update date and time
220: GUI generation program
221: analysis program
222: communication program
301: CPU
302: main storage apparatus
303: WAN communication I/F
304: input-output I/F
305: auxiliary storage V/F
306: serial communication I/F
307: LAN communication I/F
310: auxiliary storage apparatus
311: setting file
101: collection table
102: monitoring table
103: detection table
104: last acquisition date and time
105: data processing program
106: WAN communication program
111: local communication program

The invention claimed is:

1. An analysis system, comprising:
one or more gateway devices; and
an analysis server connected via a communication network,
wherein the one or more gateway devices includes a data processing unit that collects one or more pieces of equipment data from target equipment to be monitored and executes processing for judging whether or not there is an anomaly in the collected equipment data according to a judgement rule;
wherein the analysis server includes an analysis unit that transmits and receives information via the one or more gateway devices and the communication network and analyzes the received information, and an input-output unit that executes input and output of a server judgement rule corresponding to the judgement rule;
wherein the data processing unit transmits transmission data including a result of the judgement processing and the equipment data to the analysis server via the communication network;
wherein if equipment data indicating an anomaly different from an anomaly defined by the judgement rule exists in the equipment data belonging to the transmission data, the analysis unit transfers analysis result information indicating at least the different anomaly to the input-output unit;
wherein the input-output unit outputs the analysis result information indicating the different anomaly transferred from the analysis unit and also updates information of the server judgement rule based on input information;
wherein when the updated server judgement rule information is input, the data processing unit updates information of the judgement rule based on the input server judgement rule information,
wherein the data processing unit executes the judgement processing repeatedly in every preset cycle; and every time each processing terminates, the data processing unit transmits the transmission data and update query information to the analysis server via the communication network; and wherein on condition that the transmission data and information of an update query have been received, the analysis unit analyzes the received transmission data and transfers analysis result information of the analysis to the input-output unit; and wherein if the server judgement rule information is updated on condition that the analysis result information transferred from the analysis unit has been input, the input-output unit transmits the updated server judgement rule information to the one or more gateway devices via the communication network as response information to the update query.

2. The analysis system according to claim 1, wherein the data processing unit transmits, as the transmission data, a judgement result indicating an anomaly of the equipment data in the judgement result and anomaly time data judged to be anomalous by the judgement processing among the equipment data to the analysis server via the communication network; and wherein the input-output unit inputs normal time data corresponding to equipment data judged to be normal by the data processing unit among the equipment data via a network different from the communication network and transfers the input normal time data to the analysis unit.

3. The analysis system according to claim 1, wherein if normal time data judged to be normal by the judgement processing among the equipment data matches a condition for constant transmission defined in the judgement rule, the data processing unit transmits the normal time data to the analysis server via the communication network constantly or cyclically;

and if the normal time data does not match the condition for the constant transmission, the data processing unit stops transmitting the normal time data.

4. The analysis system according to claim 1, wherein if information indicating a change in an anomaly detection condition defined by the server judgement rule exists in the input information, the input-output unit updates the anomaly detection condition in the server judgement rule; and wherein the analysis unit compares normal time data, which is judged to be normal by the data processing unit among the equipment data belonging to the transmission data, with the anomalous time data defined as a target to be collected under the anomaly detection condition among the anomalous time data judged to be anomalous by the data processing unit and updates a monitoring condition defined by the server judgement rule based on a result of the comparison.

5. The analysis system according to claim 1, wherein the analysis unit updates a machine learning parameter based on a statistical value of anomalous time data judged to be anomalous by the data processing unit among the equipment data belonging to the transmission data and transmits the updated machine learning parameter to the one or more gateway devices via the communication network; and wherein when the updated machine learning parameter is input, the data processing unit executes calculation regarding which the collected equipment data based on the input updated machine learning parameter is an input and an occurrence probability of an anomalous state is an output.

6. The analysis system according to claim 1, wherein the data processing unit adds internal data collected inside the one or more gateway devices to the transmission data and transmits the transmission data including the internal data to the analysis server via the communication network; and wherein having received the transmission data including the internal data, the analysis unit analyzes the received transmission data including the internal data.

7. The analysis system according to claim 1, wherein when transferring the analysis result information indicating the different anomaly to the input-output unit, the analysis unit adds information for prompting an update of the server judgement rule to the analysis result information indicating the different anomaly; and wherein having received the analysis result information indicating the different anomaly and the information for prompting the update of the server judgement rule, the input-output unit displays, on a screen, the analysis result information indicating the different anomaly and the information for prompting the update of the server judgement rule which have been received.

8. An analysis method for an analysis system having one or more gateway devices and an analysis server connected via a communication network, the analysis method comprising:

a data processing step, which is executed by the one or more gateway devices, of collecting one or more pieces of equipment data from target equipment to be monitored and executing processing for judging whether or not there is an anomaly in the collected equipment data according to a judgement rule;

an analysis step, which is executed by the analysis server, of transmitting and receiving information to and from the one or more gateway devices via the communication network and analyzing the received information; and an input-output step, which is executed by the analysis server, of executing input and output of a server judgement rule corresponding to the judgement rule, wherein in the data processing step, the one or more gateway devices transmit transmission data including a result of the judgement processing and the equipment data to the analysis server via the communication network;

wherein in the analysis step, if equipment data indicating an anomaly different from an anomaly defined in the judgement rule exists in the equipment data belonging to the transmission data, the analysis server transfers analysis result information indicating at least the different anomaly; and in the input-output step, the analysis server outputs the analysis result information indicating the different anomaly, which has been transferred in the analysis step, and also updates information of the server judgement rule based on input information;

wherein in the data processing step, when the updated information of the server judgement rule is input from the analysis server, the one or more gateway devices update information of the judgement rule based on the input information of the server judgement rule, wherein in the data processing step, the one or more gateway devices executes the judgement processing repeatedly in every preset cycle; and every time each processing terminates, the one or more gateway devices generates the transmission data and information of an update query and transmits the transmission data and the update query information, which have been generated, to the analysis server; and wherein in the analysis step, on condition that of the transmission data and the update query information have been received, the analysis server analyzes the received transmission data and transfers analysis result information of the analysis; and in the input-output step, if the information of the server judgement rule is updated on condition that the analysis result information transferred in the analysis step has been input, the analysis server transmits the updated server judgement rule information to the one or more gateway devices as response information to the update query.

9. The analysis method according to claim 8, wherein in the data processing step, the one or more gateway devices transmit a judgement result indicating an anomaly of the equipment data in the judgement result and anomaly time data judged to be anomalous by the judgement processing among the equipment data as the transmission data to the analysis server via the communication network; and wherein in the input-output step, the analysis server inputs normal time data corresponding to equipment data judged to be normal by the one or more gateway devices among the equipment data via a network different from the communication network; and in the analysis step, the analysis server analyzes the normal time data, which has been input in the input-output step, as data belonging to the transmission data.

10. The analysis method according to claim 8, wherein in the data processing step, if normal time data judged to be normal by the judgement processing among the equipment data matches a transmission condition defined by the judgement rule, the one or more gateway devices transmit the normal time data to the analysis server via the communication network; and if the normal time data does not match the transmission condition, the one or more gateway devices stop transmitting the normal time data.

11. The analysis method according to claim 9, wherein in the input-output step, if information indicating a change in an anomaly detection condition defined by the server judgement rule exists in the input information, the analysis server updates the anomaly detection condition in the server judgement rule; and in the analysis step, the analysis server compares a normal time data judged to be normal by the one or more gateway devices among the equipment data belonging to the transmission data with anomalous time data defined as a target to be collected according to the anomaly detection condition among anomalous time data judged to be anomalous by the one or more gateway devices and updates a monitoring condition defined by the server judgement rule based on a result of the comparison.

12. The analysis method according to claim 9, wherein in the analysis step, the analysis server updates a machine learning parameter based on a statistical value of anomalous time data judged to be anomalous by the one or more gateway devices among the equipment data belonging to the transmission data and transmits the updated machine learning parameter to the one or more gateway devices; and wherein in the data processing step, if the updated machine learning parameter has been input, the one or more gateway devices execute a calculation regarding which the collected equipment data based on the input updated machine learning parameter is an input and an occurrence probability of an anomalous state is an output.

* * * * *